United States Patent
Li et al.

(10) Patent No.: US 9,215,036 B2
(45) Date of Patent: Dec. 15, 2015

(54) METHODS AND APPARATUS TO IDENTIFY THE ACCESSIBILITY OF BASE STATIONS IN COMMUNICATION SYSTEMS

(75) Inventors: Ying Li, Garland, TX (US); Zhouyue Pi, Allen, TX (US); Baowei Ji, Plano, TX (US); Farooq Khan, Allen, TX (US); Jung Je Son, Yongin-shi (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 641 days.

(21) Appl. No.: 12/771,872

(22) Filed: Apr. 30, 2010

(65) Prior Publication Data

US 2010/0203866 A1 Aug. 12, 2010

Related U.S. Application Data

(63) Continuation-in-part of application No. 12/462,023, filed on Jul. 28, 2009.

(60) Provisional application No. 61/201,911, filed on Dec. 16, 2008, provisional application No. 61/237,242, filed on Aug. 26, 2009.

(51) Int. Cl.
| | | |
|---|---|---|
| *H04M 1/66* | (2006.01) | |
| *H04M 1/68* | (2006.01) | |
| *H04L 1/00* | (2006.01) | |
| *H04W 48/10* | (2009.01) | |
| *H04W 48/02* | (2009.01) | |
| *H04W 84/04* | (2009.01) | |

(52) U.S. Cl.
CPC ............. *H04L 1/0045* (2013.01); *H04W 48/10* (2013.01); *H04L 1/0061* (2013.01); *H04W 48/02* (2013.01); *H04W 84/047* (2013.01)

(58) Field of Classification Search
CPC ..... H04W 12/06; H04W 12/02; H04W 12/08; H04W 12/10; H04W 36/06; H04W 48/10; H04W 72/005
USPC ............................. 455/435.1, 410, 411, 456.1
See application file for complete search history.

(56) References Cited

U.S. PATENT DOCUMENTS

| | | | |
|---|---|---|---|
| 2008/0207170 A1* | 8/2008 | Khetawat et al. ............. | 455/411 |
| 2009/0097436 A1* | 4/2009 | Vasudevan et al. ........... | 370/328 |

(Continued)

FOREIGN PATENT DOCUMENTS

| | | |
|---|---|---|
| EP | 1755299 A2 | 2/2007 |
| WO | WO 2007/114638 A2 | 10/2007 |
| WO | WO 2008/041495 A1 | 4/2008 |

OTHER PUBLICATIONS

Extended European Search Report dated Apr. 3, 2014 in connection with European Patent Application No. 09833634.0; 8 pages.

*Primary Examiner* — Kwasi Karikari

(57) ABSTRACT

A system and method for identifying the accessibility of a base station in a communication system. The system includes at least one Closed Subscriber Group (CSG)-Open (hybrid) base station. The base station can apply a base station identifier, such as a CSG identifier, as a cyclic redundancy check (CRC) mask to a first broadcast channel communication and can include the base station identifier in the payload of, or as a CRC mask applied to, a second broadcast channel communication. A mobile station can determine from the base station identifier in the first broadcast communication if the mobile station is a member authorized closed access to the base station. The mobile station can determine from the base station identifier in second first broadcast communication if the mobile station is a non-member authorized open access to the base station.

22 Claims, 12 Drawing Sheets

(56) References Cited

U.S. PATENT DOCUMENTS

| | | | |
|---|---|---|---|
| 2009/0176463 A1* | 7/2009 | Raaf et al. | 455/101 |
| 2009/0247170 A1* | 10/2009 | Balasubramanian et al. | 455/445 |
| 2009/0270096 A1* | 10/2009 | Somasundaram et al. | 455/434 |
| 2009/0305671 A1* | 12/2009 | Luft et al. | 455/411 |
| 2010/0008259 A1* | 1/2010 | Yoon et al. | 370/254 |
| 2010/0120426 A1* | 5/2010 | Singh et al. | 455/435.1 |
| 2010/0323663 A1* | 12/2010 | Vikberg et al. | 455/410 |
| 2011/0244870 A1* | 10/2011 | Lee | 455/444 |

\* cited by examiner

METHODS AND APPARATUS TO IDENTIFY THE ACCESSIBILITY OF BASE STATIONS IN COMMUNICATION SYSTEMS

CROSS-REFERENCE TO RELATED APPLICATION(S) AND CLAIM OF PRIORITY

This patent application is a continuation in part of patent application Ser. No. 12/462,023, entitled "METHODS AND APPARATUS TO IDENTIFY THE ACCESSIBILITY OF FEMTO-BASE STATIONS IN COMMUNICATION SYSTEMS," filed on Jul. 28, 2009, which is related to U.S. Provisional Patent No. 61/201,911, filed Dec. 16, 2008, entitled "METHODS AND APPARATUS TO IDENTIFY THE ACCESSIBILITY OF FEMTO BASE STATIONS IN COMMUNICATION SYSTEMS". The present application is related to U.S. Provisional Patent No. 61/237,242, filed Aug. 26, 2009, entitled "METHODS AND APPARATUS TO IDENTIFY THE ACCESSIBILITY OF HYBRID FEMTO BASE STATIONS IN COMMUNICATION SYSTEMS". Application Ser. No. 12/462,023 and Provisional Patent Nos. 61/237,242 and 61/201,911 are assigned to the assignee of the present application and are hereby incorporated by reference into the present application as if fully set forth herein. The present application hereby claims priority under 35 U.S.C. §120 to U.S. patent application Ser. No. 12/462,023 and claims priority under 35 U.S.C. §119(e) to U.S. Provisional Patent No. 61/237,242.

TECHNICAL FIELD OF THE INVENTION

The present application relates generally to femtocell devices and, more specifically, to identifying accessibility of femto base stations in a wireless communications system.

BACKGROUND OF THE INVENTION

Femtocell devices are small base stations designed for home or small business use. Femtocell devices operate in a small range and are designed to provide cellular coverage in the home or office. The typical femtocell device connects to a Security Gateway or Softswitch over an Internet Protocol (IP) connection, such as a Digital Subscriber Line (DSL) or broadband cable connection. The Security Gateway or Softswitch is intended to plug into the DSL or cable modem using a standard Ethernet cable.

Femto Base Stations (FBSs) can be open or closed. An open FBS accepts any compatible mobile device (e.g., accepts communications to and from any compatible cell phone, PDA, and the like). A closed FBS requires that the mobile device be authorized to access through the FBS.

SUMMARY OF THE INVENTION

A mobile station capable of communicating with a plurality of base stations is provided. The mobile station includes a receiver configured to receive a first broadcast channel communication from at least one of the plurality of base stations. The first broadcast channel communication includes a base station identifier. The mobile station also includes a main processor. The main processor is configured to extract the base station identifier from one of cyclic redundancy check (CRC) masks applied to the CRC of the first broadcast channel communication or a scrambling sequence applied to the first broadcast channel communication. The main processor further is configured to use the extracted base station identifier to determine if the mobile station is a member authorized closed access to the at least one of the plurality of base stations.

A wireless communications network comprising at least one hybrid femto base station capable of communicating with a plurality of mobile stations is provided. The hybrid femto base station includes a base transceiver subsystem configured to transmit a base station identifier via a broadcast channel. The hybrid femto base station further is configured to apply the base station identifier to a first broadcast channel communication as one of a cyclic redundancy check (CRC) mask to the CRC of the broadcast channel communication, or a scrambling sequence to the broadcast channel communication. The base station identifier is configured to be used by the mobile station to determine if the mobile station is a member authorized closed access to the at least one hybrid femto base station.

A method for identifying accessibility of a hybrid femto base station is provided. The method includes receiving, by a mobile station, a first broadcast channel communication on a broadcast channel. The method also includes extracting a base station identifier from the first broadcast channel communication. The base station identifier is applied as a cyclic redundancy check (CRC) mask to the first broadcast channel communication. Further, the method includes determining, based on the base station identifier, if the mobile station is a member authorized open access to the hybrid femto base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
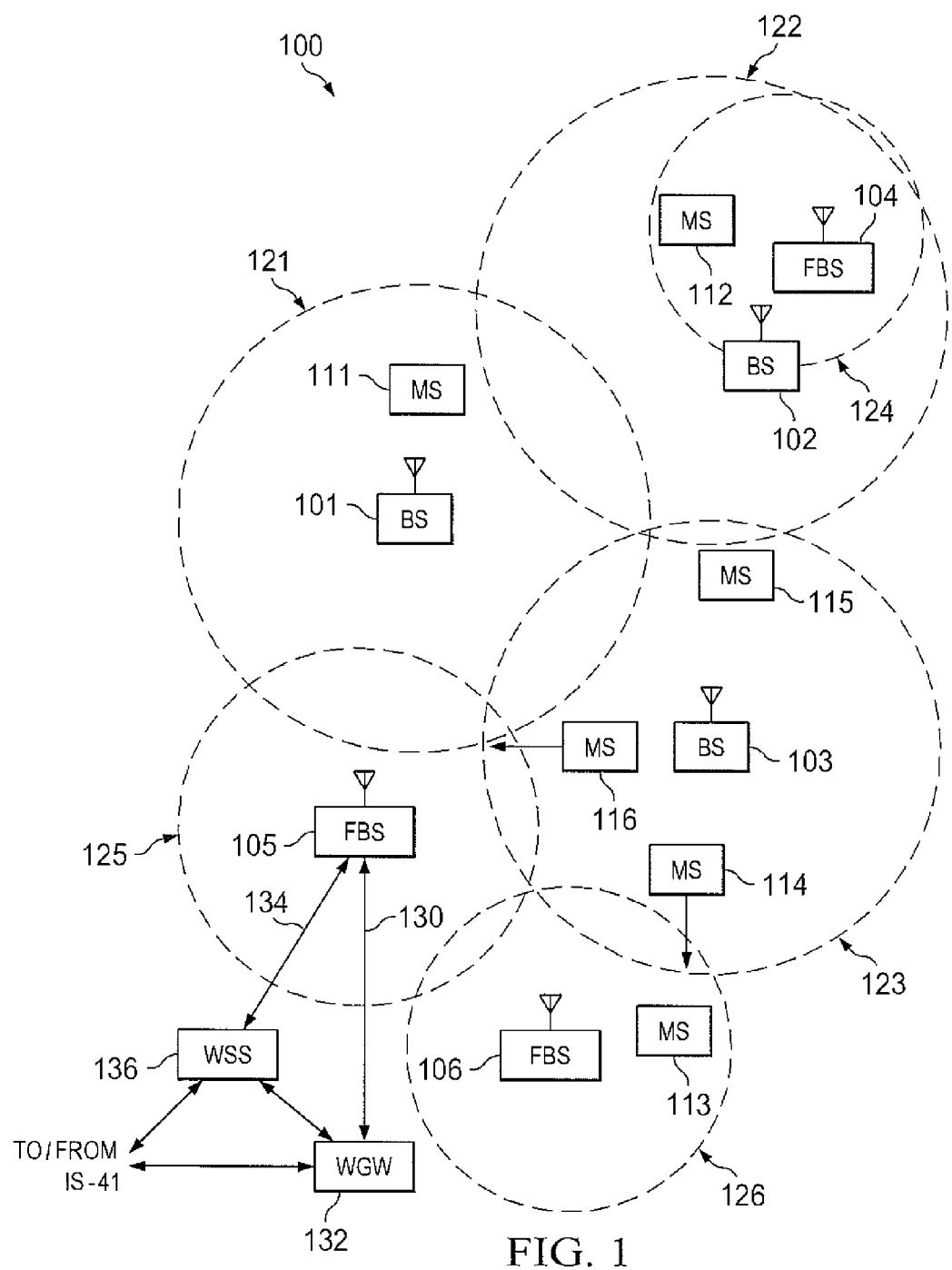
FIG. 1 illustrates exemplary wireless network 100 according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

As described in IEEE 802.16m System Requirements, a Femtocell is a low power Base Station (BS). Femtocells are typically installed by a subscriber in a home or small office/ home office to provide access to closed or open group of users as configured by the subscriber and/or the access provider. Femtocell BS's typically operate in licensed spectrum and may use the same or different frequency as macro-cells and use broadband connection such as cable or DSL for backhaul. The mobile station (MS)'s using access in a femtocell are typically stationary or moving at low (i.e., pedestrian) speed.

Femtocells are different from macro cells. Embodiments of the present disclosure provide a system and method to identify femto base stations as well as to distinguish femtocells from macro cells. Further, embodiments of the present disclosure distinguish open-access femtocell (which allow any compatible MS to access) from the Closed Subscriber Group (CSG) femtocell (which allows only authorized MS's, i.e., the MS's belonging to this femtocell, to access), since some operations, such as, but not limited to, handover, paging, and the like, will be different for femtocells and macro cells, and for open-access and CSG femtocells. For example, the MS with high speed may not need to handover to any femtocells, the open-access femto base stations may accept the handover requests from MS while the MS that does not belong to a CSG femtocell may not need to send handover request to that femtocell, and so forth.

The embodiments of the present disclosure are not limited to femtocells, although femtocells are illustrated as examples. The embodiments can be used with any type or sized base station with some level of accessibility differentiation such as open to all mobile stations (e.g., open BS), or open to limited/ authorized/subscribed mobile stations (e.g., CSG BS), or open to all mobile station but with limited/authorized/subscribed mobile stations having higher priority and other mobile stations having lower priority (e.g., hybrid BS), and so forth. The concept of the CSG is not limited to femtocells only, but also can be applicable to other BSs, such as microcells, picocells, relays, and the like.

Embodiments of the present disclosure provide a system and method to identify femtocell base stations with different CSG IDs. The femtocell base station is configured to inform a mobile station regarding an identification of CSG with the CSG ID. Therefore, even if the MS knows the femtocell is of a CSG type, the MS also is informed whether this femtocell is closed for or authorized for the MS to access, i.e., the MS knows whether the MS can access this CSG or not. In some embodiments, the MS is configured to store a list (such as a white-list) of the CSG femtocells that the MS can access. As such when the MS receives the CSG ID of a CSG femtocell, the MS checks the received CSG ID with the list of the accessible femtocells. If the received CSG ID is in the list of the MS's list of accessible femtocells, the MS knows the CSG is accessible. Hence, a CSG ID of the CSG femtocell is sent to MS's via wireless communication signaling. To make the list of accessible CSG femtocells of a MS short, in some embodiments, multiple CSG femtocells share a common CSG ID if these CSG femtocells have the same set of MS's allowed to access them. For example, if a user subscribes via a chain of coffee shops to access the closed femtocells at each coffee shop, the CSG femtocells for the coffee shops will share the common CSG ID.

In some examples, different groups of preambles are used to distinguish femtocells from macro cells. The preambles are divided into two groups, one for femtocells, and another for macro cells. In the case of a large number of femtocells and insufficient preambles, the preambles are dynamically allocated. In some examples, one bit in least significant bit (LSB) that is a 24 programmable bit segment of the base station ID is used to distinguish femtocell and macro cell, and to use another bit in LSB to distinguish femtocell open-access mode and CSG mode. This approach will increase the overhead of Broadcast Channel (BCH), which is very expensive. In additional and alternative examples, different scrambling sequences and/or different CRCs (cyclic redundancy check) to differentiate femto BS from macro BS's, and to differentiate open-access femto BS and CSG femto BS.

FIG. 1 illustrates exemplary wireless network 100 according to embodiments of the present disclosure. The embodiment of wireless network 100 illustrated in FIG. 1 is for illustration only. Other embodiments of the wireless network 100 could be used without departing from the scope of this disclosure.

Wireless network 100 comprises a plurality of cells 121-126, each containing one of the Base Stations (BS), BS 101, BS 102, or BS 103 or Femto Base Stations (FBS), FBS 104, FBS 105 or FBS 106. Base stations 101-103 communicate with a plurality of mobile stations (MS) 111-116 over code division multiple access (CDMA) channels), Orthogonal Frequency Division Multiple Access (OFDMA), or any other communications standard as is known in the art. In some embodiments, mobile stations 111-116 are capable of receiving data traffic and/or voice traffic on two or more CDMA channels simultaneously. Mobile stations 111-116 may be any suitable wireless devices (e.g., conventional cell phones, PCS handsets, personal digital assistant (PDA) handsets, portable computers, telemetry devices) that are capable of communicating with base stations 101-103 via wireless links.

Dotted lines show the approximate boundaries of the cells 121-123 in which base stations 101-103 are located. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122, 123 and the base station controller associated with each base transceiver subsystem are collectively represented by BS 101, BS 102, and BS 103, respectively.

In some embodiments, BS 101, BS 102 and BS 103 transfer voice and data signals between each other and the public switched telephone network (PSTN) (not shown), or any IS-41 communication network as is known in the art, via communication line (not shown) and mobile switching center (MSC) (not shown). The communication line may be any suitable connection means, including a T1 line, a T3 line, a fiber optic link, a network packet data backbone connection, or any other type of data connection. The communication line links each vocoder in the BSC with switch elements in the MSC. The connections on communication line may transmit analog voice signals or digital voice signals in pulse code modulated (PCM) format, Internet Protocol (IP) format, asynchronous transfer mode (ATM) format, or the like.

The MSC is a switching device that provides services and coordination between the subscribers in a wireless network and external networks, such as the IS-41, PSTN, or Internet. The MSC is well known to those skilled in the art. In some embodiments of the present disclosure, communications line may be several different data links where each data link couples one of BS 101, BS 102, or BS 103 to the MSC.

The wireless network 100 includes a femto-cell base station 124-126. Each FBS 124-126 includes components analogous to those found in macro base stations BS 101, BS 102 and BS 103. As such, FBS 124, FBS 125 and FBS 126 each comprises a femto base station controller (FBSC) and one or more femto base transceiver subsystem(s) (FBTS). Each of FBS 124, FBS 125 and FBS 126 communicates with mobile stations in its served area using wireless fidelity, IS-95, CDMA or any other cellular communications standard.

Voice and data signals are transferred between the FBS 104, FBS 105 and FBS 106 and the IS-41 network (e.g., PSTN) via communications lines, wireless gateway and wireless soft switches. For example, Voice signals are transferred between the FBS 105 and the IS-41 network via communication line 130, Wireless Gateway (WGW) 132. Data signals are transferred between the FBS 105 and the IS-41 network via communication line 134 and Wireless Soft Switch (WSS) 136. The WGW 132 and WSS 136 are coupled via a backhaul connection (not shown), e.g., the IS-41, to the MSC. The WGW 132 provides a bearer path between FBS 105 and the MSC via the IS-41. The WSS 136 provides a signaling path FBS 105 and WGW 132 as well as to the MSC via the IS-41.

A dotted line shows the approximate boundaries of cells 124-126 in which FBS 104, FBS 105 and FBS 106 are located. The cell is shown approximately circular for the purposes of illustration and explanation only. It should be clearly understood that the cell may have an irregular shape, depending on the cell configuration selected and natural and man-made obstructions.

In the exemplary wireless network 100, MS 111 is located in cell 121 and is in communication with BS 101. MS 112 is located in cell 121 and cell 124 and is in communication with BS 102. MS 113 is located in cell 126, is in communication with FBS 106. MS 114 is located in cell 123, is in communication with BS 103 and is moving in the direction of cell 126, as indicated by the direction arrow proximate MS 114. At some point, as MS 114 moves into cell 126 and MS 114 will detect signals from FBS 106. MS 115 is located in cell 123 and is in communication with BS 103. MS 115 also is located close to the edge of cell 122. MS 116 is located in cell 123, is in communication with BS 103 and is moving in the direction of cell 121 and cell 125. At some point, as MS 116 moves into area covered by cell 121 and cell 125, MS 116 will detect signals from BS 101 and FBS 105 and a handoff will occur.

The handoff procedure transfers control of a call from a first cell to a second cell. A handoff may be either a "soft handoff" or a "hard handoff." In a "soft handoff" a connection is made between the mobile station and the base station in the second cell before the existing connection is broken between the mobile station and the base station in the first cell. In a "hard handoff" the existing connection between the mobile station and the base station in the first cell is broken before a new connection is made between the mobile station and the base station in the second cell.

When the strength of the pilot that is transmitted by a non-serving base station, or non-serving femto base station, and received and reported by a mobile station to a serving base station exceeds a threshold, the serving base station initiates a handoff process by signaling the mobile station and the target base station that a handoff is required. For example, BS 103 signals MS 114 and FBS 106 when the pilot signals transmitted by FBS 106 and received and reported by MS 114 to BS 103 exceed a threshold. BS 102 signals target FBS 106 by sending a communication via the MSC and the WSS 136 to FBS 106. In an additional example, if MS 114 is moving from FBS 106 to BS 103, when the strength of the pilot that is transmitted by BS 103 and received and reported by MS 114 to FBS 106 exceeds a threshold, FBS 106 initiates a handoff process by signaling MS 114 and the target BS 103 that a handoff is required. FBS 106 signals target BS 103 by sending a communication via the WSS 136 to the MSC to BS 103.

In another example, in an inter-frequency handoff, as MS 114 moves from cell 125 to cell 123, MS 114 conducts a Candidate Frequency Search (CFS). After the target base stations are identified, a report of the target base stations is reported by MS 114 to FBS 106, FBS 106 initiates a handoff process by signaling MS 114 and the target BS 103 that a handoff is required. FBS 106 signals target BS 102 by sending a communication via the WSS 136 to the MSC to BS 103.

As shown in FIG. 1, MS 112 is located in both cell 122 and cell 124. FBS 104 is a CSG FBS. Furthermore, MS 112 has not subscribed to FBS 104. Therefore, MS 112 is not authorized to access FBS 104. Accordingly, MS 112 is not in communication with FBS 104 and is only in communication with BS 102.

Additionally, MS 114 is moving from BS 103 towards FBS 106. FBS 106 is an open-access FBS. As MS 114 enters cell 126, MS 114 becomes aware of FBS 106 as MS 114 receives signaling from FBS 106. The signaling contains a base station identifier (e.g., base station identity, or some other value) for FBS 106 indicating that FBS 106 is an open FAP. Since FBS 106 is an open FAP, all compatible wireless devices, including MS 114, are authorized to access FBS 106. In some embodiments, a handoff occurs wherein communications between MS 114 and BS 103 are terminated and communications between MS 114 and FBS 106 are established. MS 114 may still be located within cell 123 and in communication with FBS 104.

Furthermore, MS 116 is moving from BS 103 towards FBS 105. FBS 105 is a closed FBS. Therefore, only authorized wireless devices are allowed to access FBS 105. For example, FBS 105 may be located in a Starbucks® and only individuals who have subscribed for access a FBS through Starbuck® are allowed to access FBS 105. A subscriber with MS 116 enters cell 125. MS 116 receives signaling from FBS 105. The signaling includes a Closed Subscriber Group (CSG) Identification (ID) for FBS 105. MS 116 recognizes the CSG ID for FBS 105 and a handoff of MS 116 from BS 103 to FBS 105 occurs.

Figure 2:
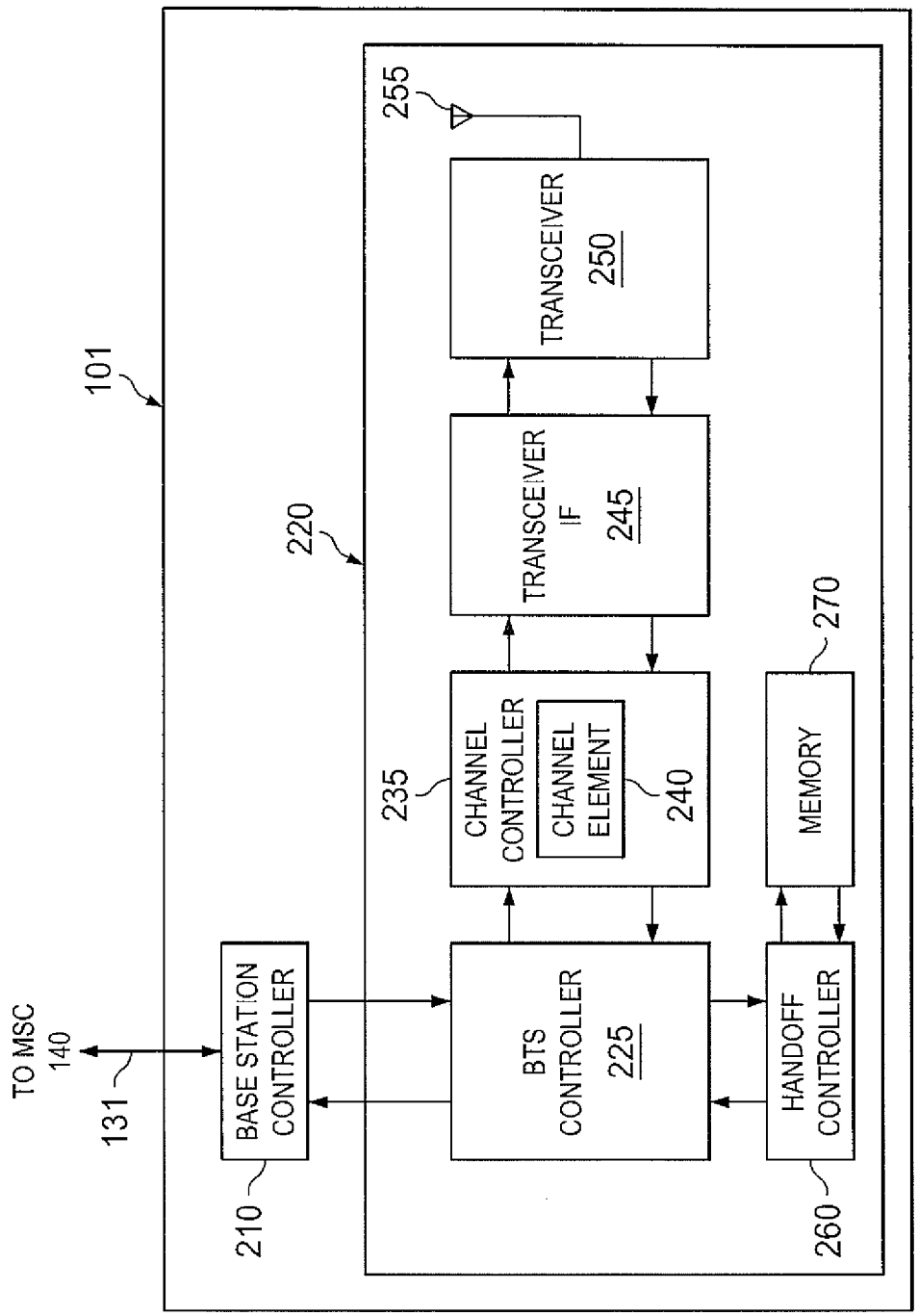
FIG. 2 illustrates exemplary base station 101 in greater detail according to one embodiment of the present disclosure.

FIG. 2 illustrates exemplary base station 101 in greater detail according to one embodiment of the present disclosure. The embodiment of base station 101 illustrated in FIG. 2 is for illustration only. Other embodiments of the base station 101 could be used without departing from the scope of this disclosure. It will be understood that although BS 101 is described for illustration and example only, descriptions can apply to BS 102 and BS 103 equally.

Base station 101 includes base station controller (BSC) 210 and base transceiver subsystem (BTS) 220. Base station controllers and base transceiver subsystems were described previously in connection with FIG. 1. BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 101 without departing from the scope of this disclosure.

BTS controller 225 includes processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In some embodiments, the channel elements communicate according to a code division multiple access (CDMA) protocol with the mobile stations in cell 121. In additional and alternative embodiments, the channel elements communicate according to an OFDMA protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In some embodiments, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments, handoff controller 260 is capable of determining a list of candidate target base stations for handoff. Handoff controller 260 is configured to dynamically adjust a threshold parameter used in inter-frequency (i.e., different frequency) hard handoffs. Handoff controller 260 also is configured to dynamically adjust the threshold parameter used in intra-frequency (i.e., same frequency) hard handoffs. Handoff controller 260 is operable to store the threshold parameters and list of candidate target base stations in a memory 270.

Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

Figure 3:
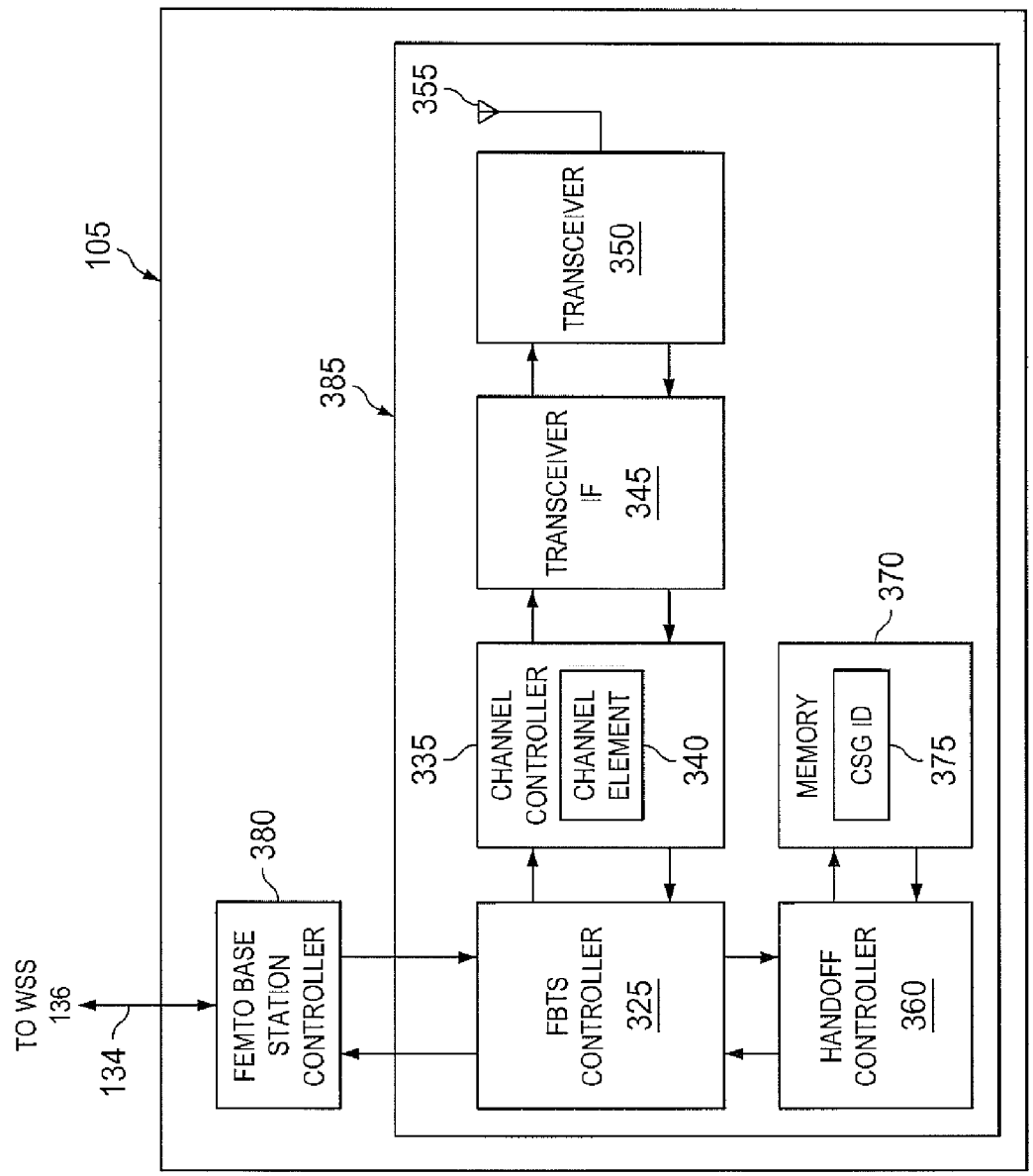
FIG. 3 illustrates exemplary femto base station 105 in greater detail according to one embodiment of the present disclosure.

FIG. 3 illustrates exemplary femto base station 105 in greater detail according to one embodiment of the present disclosure. The embodiment of femto base station 105 illustrated in FIG. 3 is for illustration only. Other embodiments of the femto base station 105 could be used without departing from the scope of this disclosure. It will be understood that although FBS 105 is described for illustration and example only, descriptions can apply to FBS 104 and FBS 106 equally.

Femto base station 105 includes femto base station controller (FBSC) 380 and femto base transceiver subsystem (FBTS) 385. Femto base station controllers and femto base transceiver subsystems were described previously in connection with FIG. 1. FBTS 385 also includes a handoff controller 360. The embodiment of the handoff controller 360 and memory 370 included within FBTS 385 is for illustration only. Handoff controller 360 and memory 370 can be located in other portions of FBS 105 without departing from the scope of this disclosure.

FBSC 380 includes processing circuitry and memory capable of executing an operating program that controls the overall operation of FBTS 385. Under normal conditions, FBSC 380 directs the operation of channel controller 335, which contains a number of channel elements, including channel element 340, that perform bi-directional communications in the forward channels and the reverse channels. A forward channel refers to a channel in which signals are transmitted from the femto base station to the mobile station. A reverse channel refers to a channel in which signals are transmitted from the mobile station to the femto base station. Transceiver IF 345 transfers the bi-directional channel signals between channel controller 340 and RF transceiver unit 350.

Antenna array 355 transmits forward channel signals received from RF transceiver unit 350 to mobile stations in the coverage area of PBS 105. Antenna array 355 also sends to transceiver 350 reverse channel signals received from mobile stations in the coverage area of FBS 105. In a preferred embodiment of the present disclosure, antenna array 355 is a multi-sector antenna, such as a three-sector antenna in which each antenna sector is responsible for transmitting and receiving in a 120° arc of coverage area. Additionally, RF transceiver 350 may contain an antenna selection unit to select among different antennas in antenna array 355 during transmit and receive operations.

According to an exemplary embodiment of the present disclosure, handoff controller 360 is capable of determining a list of candidate target base stations for handoff. Handoff controller 360 is configured to dynamically adjust a threshold parameter used in inter-frequency (i.e., different frequency) hard handoffs. Handoff controller 360 also is configured to dynamically adjust the threshold parameter used in intra-frequency (i.e., same frequency) hard handoffs. Handoff controller 360 is operable to store the threshold parameters and list of candidate target base stations in a memory 370.

Memory 370 can be any computer readable medium, for example, the memory 370 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 370 comprises a random access memory (RAM) and another part of memory 370 comprises a Flash memory, which acts as a read-only memory (ROM). In some embodiments, memory 370 includes a CSG ID 375 that indicates an identity of FBS 105 and that FBS 105 is a closed subscriber group femto base station, or both.

Figure 4:
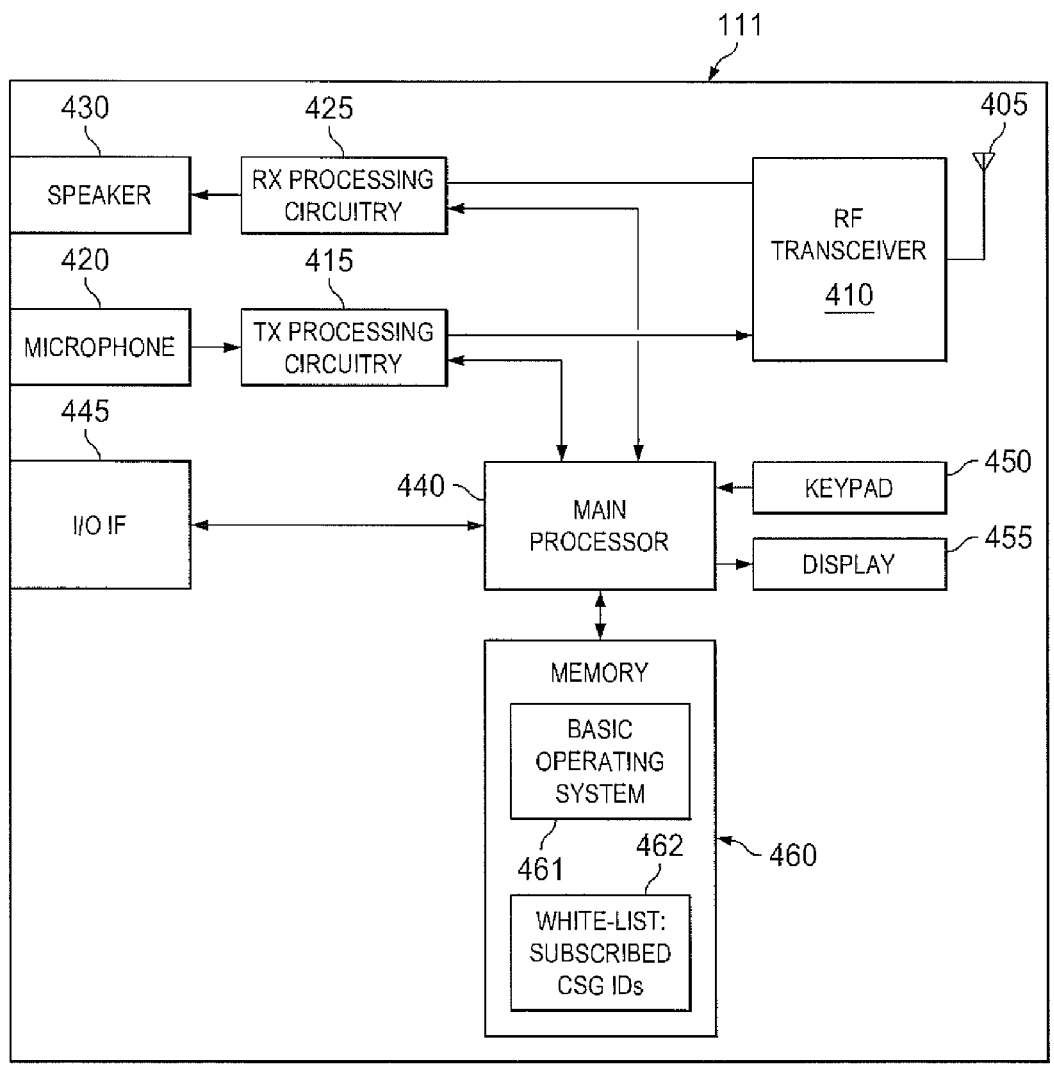
FIG. 4 illustrates wireless mobile station 111 according to embodiments of the present disclosure.

FIG. 4 illustrates wireless mobile station 111 according to embodiments of the present disclosure. The embodiment of wireless mobile station 111 illustrated in FIG. 4 is for illustration only. Other embodiments of the wireless mobile station 111 could be used without departing from the scope of this disclosure. It will be understood that although MS 111 is described for illustration and example only, descriptions can apply to MS 112-116 equally.

Wireless mobile station 111 includes antenna 405, radio frequency (RF) transceiver 410, transmit (TX) processing circuitry 415, microphone 420, and receive (RX) processing circuitry 425. MS 111 also includes speaker 430, main processor 440, input/output (I/O) interface (IF) 445, keypad 450, display 455, and memory 460. Memory 460 further includes basic operating system (OS) program 461 and white-list including a plurality of CSG IDs 462.

Radio frequency (RF) transceiver 410 receives from antenna 405 an incoming RF signal transmitted by a base station (e.g., either a base station or femto base station) of wireless network 100. Radio frequency (RF) transceiver 410 down-converts the incoming RF signal to produce an intermediate frequency (IF) or a baseband signal. The IF or baseband signal is sent to receiver (RX) processing circuitry 425 that produces a processed baseband signal by filtering, decoding, and/or digitizing the baseband or IF signal. Receiver (RX) processing circuitry 425 transmits the processed baseband signal to speaker 430 (i.e., voice data) or to main processor 440 for further processing (e.g., web browsing).

Transmitter (TX) processing circuitry 415 receives analog or digital voice data from microphone 420 or other outgoing baseband data (e.g., web data, e-mail, interactive video game data) from main processor 440. Transmitter (TX) processing circuitry 415 encodes, multiplexes, and/or digitizes the outgoing baseband data to produce a processed baseband or IF signal. Radio frequency (RF) transceiver 410 receives the outgoing processed baseband or IF signal from transmitter (TX) processing circuitry 415. Radio frequency (RF) transceiver 410 up-converts the baseband or IF signal to a radio frequency (RF) signal that is transmitted via antenna 405.

In some embodiments of the present disclosure, main processor 440 is a microprocessor or microcontroller. Memory 460 is coupled to main processor 440. According to some embodiments, part of memory 460 comprises a random access memory (RAM) and another part of memory 460 comprises a Flash memory, which acts as a read-only memory (ROM).

Main processor 440 executes basic operating system (OS) program 461 stored in memory 460 in order to control the overall operation of wireless mobile station 111. In one such operation, main processor 440 controls the reception of forward channel signals and the transmission of reverse channel signals by radio frequency (RF) transceiver 410, receiver (RX) processing circuitry 425, and transmitter (TX) processing circuitry 415, in accordance with well-known principles.

Main processor 440 is capable of executing other processes and programs resident in memory 460. Main processor 340 can move data into or out of memory 460, as required by an executing process. Main processor 440 is also coupled to I/O interface 445. I/O interface 445 provides mobile station 111 with the ability to connect to other devices such as laptop computers and handheld computers. I/O interface 445 is the communication path between these accessories and main controller 440.

Main processor 440 is also coupled to keypad 450 and display unit 455. The operator of mobile station 111 uses keypad 450 to enter data into mobile station 111. Display 455 may be a liquid crystal display capable of rendering text and/or at least limited graphics from web sites. Alternate embodiments may use other types of displays.

Main processor 440 is configured to utilize thresholds received from an FBS, e.g., FBS 105, to assist in performing a hard handoff. Main processor 105 is configured to execute a plurality of instructions in memory 460 to determine when conditions are such that a handoff should be or can be performed.

Main processor 440 further is configured to store one or more CSG IDs 462 for use in accessing closed FAPs. When a user (e.g., subscriber) subscribes to a FAP service, the user is provided with one or more CSG IDs 462 in order to access one or more respective FBSs. In some embodiments, the user's wireless device (e.g., MS 111) receives the CSG IDs 462 wirelessly via one or more of the wireless connections between the MS and a BS and the MS and another FBS. In some embodiments, the user enters the CSG IDs 462 into the wireless device (e.g., MS 111) using one or more of I/O IF 445, keypad 450 and display 455. Furthermore, the user can subscribe to multiple closed FAPs and, thus, receive and store multiple CSG ID's 462 corresponding to the various closed FAPs to which subscriptions have been obtained.

In some embodiments, main processor 440 is configured to operate as a CRC examiner. In such embodiments, the main processor 440 is configured to judge whether a remainder (e.g., a mask discussed in further detail herein below) of the CRC decoding matches the base station identifier and closed subscriber group identifier (CSG ID).

Figure 5:
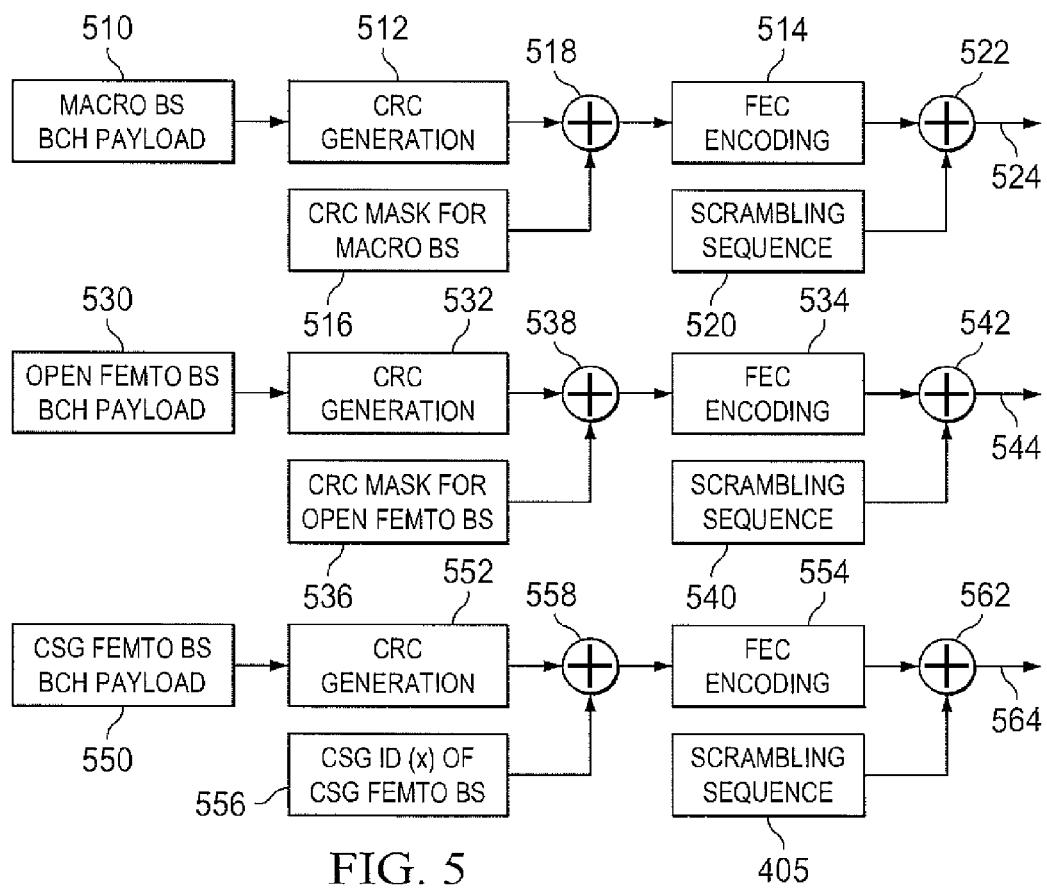
FIG. 5 illustrates example processing at base stations using different CRC masks to distinguish different base stations.

FIG. 5 illustrates example processing using different CRCs to distinguish different base stations. The embodiment of the processing 500 shown in FIG. 5 is for illustration only. Other embodiments could be used without departing from the scope of this disclosure.

In some embodiments, FBS 105 is a CSG base station. FBS 105 applies its CSG ID, or a sequence generated from CSG ID, as a Cyclic Redundancy Check (CRC) mask to the CRC of the Broadcast Channel (BCH) of the FBS 105. In applying the CRC mask to the CRC, FBS 105 combines the CRC mask in an XOR operation with the CRC.

The Broadcast Channel is the control channel on which a base station broadcasts some of its most important system information. For example, in an OFDM based multiple-input-multiple-output (MIMO) wireless system, the BCH often carries information about system bandwidth, antenna configuration, configuration of other control channels, and other critical system configurations. A mobile station needs to correctly detect the BCH of a base station in order to establish further communication with that base station. It will be understood that the BCH may be referred to as different channels in different systems.

In some embodiments, different CRC masks are applied to the BCH of different base stations. For example, BS 101 is a macro base station, FBS 106 is an open-access femto base station, while FBS 105 is a CSG femto base station.

BS 101 transmits a BCH payload 510. The BCH payload 510 is protected by a CRC 512 before the forward-error-correction (FEC) encoding 514. The CRC 512 of the BCH is calculated based on the BCH payload 510 and can be used for error detection of the BCH at the receiver. BS 101 applies a CRC mask 516 for a macro base station to the CRC 512 of the BCH. BS 101 applies the CRC mask 516 by performing an XOR operation 518 with the CRC 512. Thereafter, a scrambling sequence 520 applied by an XOR operation 522 and the signal is transmitted on the BCH.

Additionally, FBS 106, e.g., the open-access femto base station, transmits a BCH payload 530. The BCH payload 530 is protected by a CRC 532 before the FEC encoding 534. The CRC 532 of the BCH is calculated based on the BCH payload 530 and can be used for error detection of the BCH at the receiver. FBS 106 applies a CRC mask 536 for an open-access femto base station to the CRC 532 of the BCH. FBS 106 applies the CRC mask 536 by performing an XOR operation 538 with the CRC 532. Thereafter, a scrambling sequence 540 applied by an XOR operation 542 and the signal is transmitted on the BCH.

Furthermore, FBS 105, e.g., the CSG femto base station, transmits a BCH payload 550. The BCH payload 550 is protected by a CRC 552 before the FEC encoding 554. The CRC 552 of the BCH is calculated based on the BCH payload 550 and can be used for error detection of the BCH at the receiver. FBS 105 applies its CSG ID (x) 556 as the CRC mask to the CRC of the BCH of the CSG femto base station. FBS 105 applies the CSG ID (x) 556 by performing an XOR operation 558 with the CRC 552. Thereafter, a scrambling sequence 560 applied by an XOR operation 562 and the signal is transmitted on the BCH.

Figure 6:
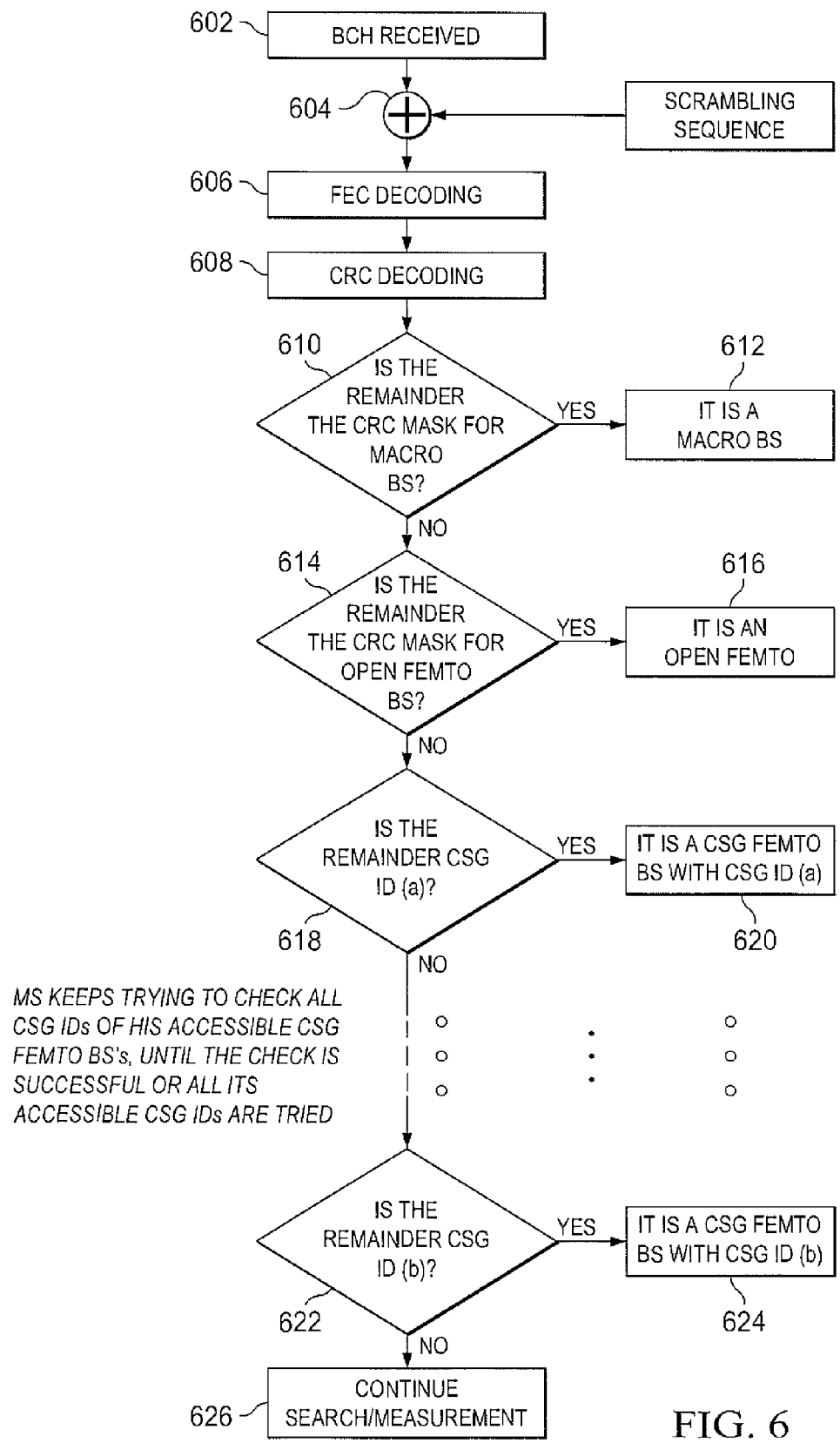
FIG. 6 illustrates a decoding operation by a mobile station using different CRCs to distinguish different base stations and accessibility according to embodiments of the present disclosure.

FIG. 6 illustrates a decoding operation by a mobile station using different CRCs to distinguish different base stations according to embodiments of the present disclosure. The embodiment of the decoding operation 600 shown in FIG. 6 is for illustration only. Other embodiments could be used without departing from the scope of this disclosure.

The mobile station, e.g., MS 116 for example purposes, receives the BCH transmission in step 602. MS 116 removes the applied scrambling sequence by performing an XOR operation in step 604 on the received BCH (from step 602) using a scrambling sequence. MS 116 performs FEC decoding in step 606 and CRC decoding in step 608. Then, a CRC examiner in the MS 116 identifies a remainder resulting from the CRC decoder and proceeds to step 610.

In step 610, MS 116 determines if the remainder is the CRC mask for a macro base station. If MS 116 determines that the remainder is the CRC mask for BS 101, then MS 116 identifies the target base station as the macro BS 101 in step 612. MS 116 communicates to its serving base station e.g., BS 103, regarding the signals received from BS 101. Thereafter, BS 103 can initiate a handoff of MS 116 to BS 101. If MS 116 determines that the remainder is not the CRC mask for a macro base station, then the operation proceeds to step 614.

In step 614, MS 116 determines if the remainder is the CRC mask for the open access femto BS. If MS 116 determines that the remainder is the CRC mask for FBS 106 (e.g., the open-access femto BS), then MS 116 identifies the target base station is the open-access femto BS, FBS 106, in step 616. MS 116 communicates to its serving base station e.g., BS 103, regarding the signals received from FBS 106. Thereafter, BS 103 can initiate a handoff of MS 116 to FBS 106. If MS 116 determines that the remainder is not the CRC mask for an open-access femto base station, then the operation proceeds to step 618.

In step 618, MS 116 determines if the remainder is a CSG ID for a CSG FBS that corresponds with an accessible CSG FBS (e.g., a CSG FBS to which MS 116 is allowed access). MS 116 compares the remainder with the CSG IDs stored in MS 116 (e.g., in a list of CSG IDs 462 stored in memory 460 discussed in further detail herein above with respect to FIG. 4). If MS 116 determines that the remainder is one of the CSG IDs in the list of the accessible CSG IDs of MS 116, then MS 116 identifies that the base station is a CSG femto BS with CSG ID same as the remainder in step 620. For example, MS 116 can identify the base station as FBS 105. MS 116 communicates to its serving base station e.g., BS 103, regarding the signals received from FBS 105. Thereafter, BS 103 can initiate a handoff of MS 116 to FBS 105. Additionally, if MS 116 determines that the remainder is not the CRC mask for FBS 105, then, in step 622 MS 116 continues to check the remainder with all CSG IDs of its accessible CSG femto BS's, until the check is successful and a CSG femto BS is identified in step 624 or all accessible CSG IDs stored in MS 116 are checked. In the event that MS 116 is unable to match the remainder with a CSG ID stored in memory, then MS 116 will continue to search and measure signals received in step 626.

Accordingly, in such embodiments, the CSG ID of a closed-subscriber-group communication base station is indicated in the CRC mask of the CRC functionality utilized in protecting the BCH of the base station. Therefore no additional payload bits in BCH are needed for the indication of CSG ID.

In some embodiments, the CRC mask for BS 101 is reserved as a sequence of all zeros, and an open CSG ID is reserved for FBS 106 (e.g., for open-access femto base stations). With a sequence of all zeros as the CRC mask, BS 101 operations remain unchanged compared a system without femtocells. For example, BS 101 operations are the same as the one without CRC mask, and the FBS's will have the CRC masks depending on FBS access modes and a CSG ID, if the FBS's are CSG FBSs.

Figure 7:
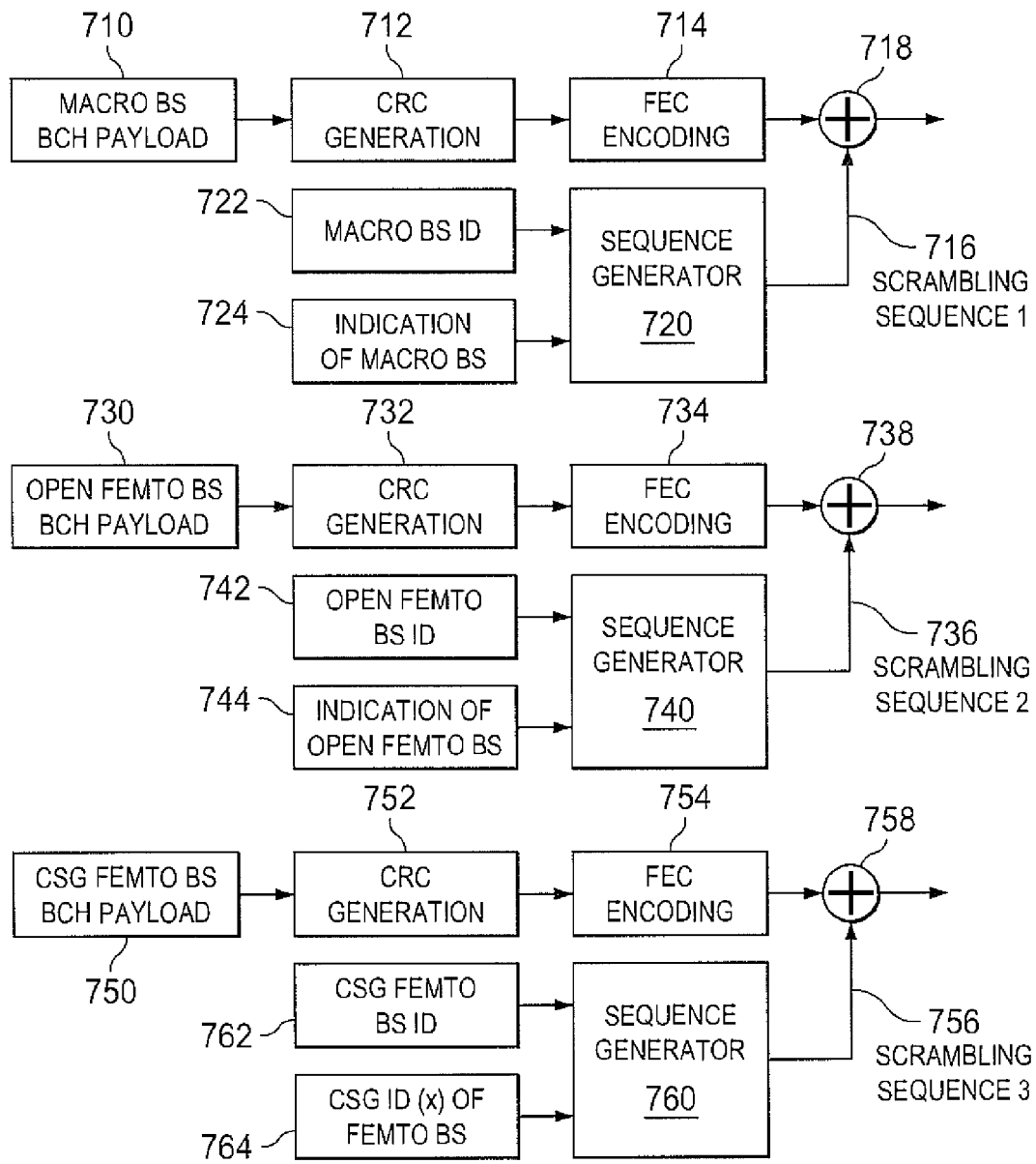
FIG. 7 illustrates example processing at base stations using different scrambling sequences to distinguish different base stations according to embodiments of the present disclosure.

FIG. 7 illustrates example processing using different scrambling sequences to distinguish different base stations. The embodiment of the processing 700 shown in FIG. 7 is for illustration only. Other embodiments could be used without departing from the scope of this disclosure.

In some embodiments, FBS 105 (e.g., a closed subscriber group (CSG) base station) generates scrambling sequence using its CSG ID or a sequence generated from the CSG ID. As a result, the scrambling sequence generated by FBS 105 is different from the scrambling sequences of other base stations such as, but not limited to, BS 101, BS 102, BS 103, FBS 104 and FBS 106. In some embodiments, the scrambling sequence is optionally generated using the preamble sequence of the base station or the base station ID, in addition to the CSG ID as the input of the scrambling sequence.

The preamble sequence is a sequence carried on a preamble that is transmitted by a base station and used by a mobile station to perform time and frequency synchronization with that base station. The preamble sequence often is determined by and shorter than the base station identification (BS ID) which can be an identifier of base station globally. The preamble sequence usually is unique within an area and reused in other areas. Once a mobile station acquires the preamble of a base station, the mobile station can identify the base station and locally attempt a decoding of the BCH of that base station in order to learn more about the configuration of that base station.

For example, there can be an any-to-one correspondence between preamble sequence and the BS ID, and one-to-one correspondence if the preamble sequences can be of enough number. Furthermore, the preamble may be referred to as different channels in different systems, such as synchronization channel, primary synchronization channel and secondary synchronization channel, and the like.

As illustrated in FIG. 7, the scrambling sequence is combined in an XOR operation with the encoded bit stream of the BCH. For example, BS 101 is a macro base station, FBS 106 is an open-access femto base station, while FBS 105 is a CSG femto base station.

BS 101 generates a scrambling sequence by using an indication of a macro base station and a macro base station ID for BS 101. BS 101 prepares a BCH payload 710 for transmission. BS 101 then applies CRC generation 712 and FEC coding 714 to the BCH payload 710. Thereafter, BS 101 applies a first scrambling sequence 716 to the BCH payload 710 by performing an XOR operation 718. The first scrambling sequence 716 is generated by a sequence generator block 720 located in BS 101. For example, sequence generator block 720 can be located in transceiver 250 discussed herein above with respect to FIG. 2. The sequence generator block 720 uses a macro BS ID 722 for BS 101 and a first value 724 that provides an indication of a macro BS to generate the first scrambling sequence 716. The first value 724 can be, but is not limited to, an indicator stored in memory 270. In some such embodiments, the first scrambling sequence 716, using the macro BS ID 722 for BS 101 and first value 724 is uniquely associated to BS 101.

FBS 106 generates a scrambling sequence by using an indication of a femtocell base station and a femtocell base station ID for FBS 106. FBS 106 prepares a BCH payload 730 for transmission. FBS 106 then applies CRC generation 732 and FEC coding 734 to the BCH payload 730. Thereafter, FBS 106 applies a second scrambling sequence 736 to the BCH payload 730 by performing an XOR operation 738. The second scrambling sequence 736 is generated by a sequence generator block 740 located in FBS 106. For example, sequence generator block 740 can be located in transceiver 350 discussed herein above with respect to FIG. 3. The sequence generator block 740 uses an Open femto base station ID 742 for FBS 106 and a second value 744 configured to provide an indication of an open-access femto base station. The second value 744 can be, but is not limited to, an indicator stored in memory 370. In some such embodiments, the second scrambling sequence 736, using the Open femto base station ID 742 for FBS 106 and second value 744 is uniquely associated to FBS 106.

FBS 105 generates a scrambling sequence by using an indication of a femtocell base station and a femtocell base station ID for FBS 105. FBS 105 prepares a BCH payload 750 for transmission. FBS 105 then applies CRC generation 752 and FEC coding 754 to the BCH payload 750. Thereafter, FBS 105 applies a third scrambling sequence 756 to the BCH payload 750 by performing an XOR operation 758. The third scrambling sequence 756 is generated by a sequence generator block 760 located in FBS 105. For example, sequence generator block 740 can be located in transceiver 350 discussed herein above with respect to FIG. 3. The sequence generator block 760 uses a CSG BS ID 762 for FBS 105 and a CSG ID (x) 764 for FBS 105. In some such embodiments, the third scrambling sequence 756, using the CSG BS ID 762 for FBS 105 and the CSG ID (x) 764 for FBS 105 is uniquely associated to FBS 105.

In some embodiments, the base station IDs 722, 742, 762 used in the scrambling sequence generator are optional (i.e., the base station IDs may not be used in generating the scrambling sequences). The CRC and FEC are used to protect the BCH.

It will be understood that other types of communication stations can be used without departing from the scope of this disclosure. For example, the first base station, BS 101, can be a relay base station and the second base station, previously FBS 106 in the above example, can be a macro base station, such as BS 102.

Figure 8:
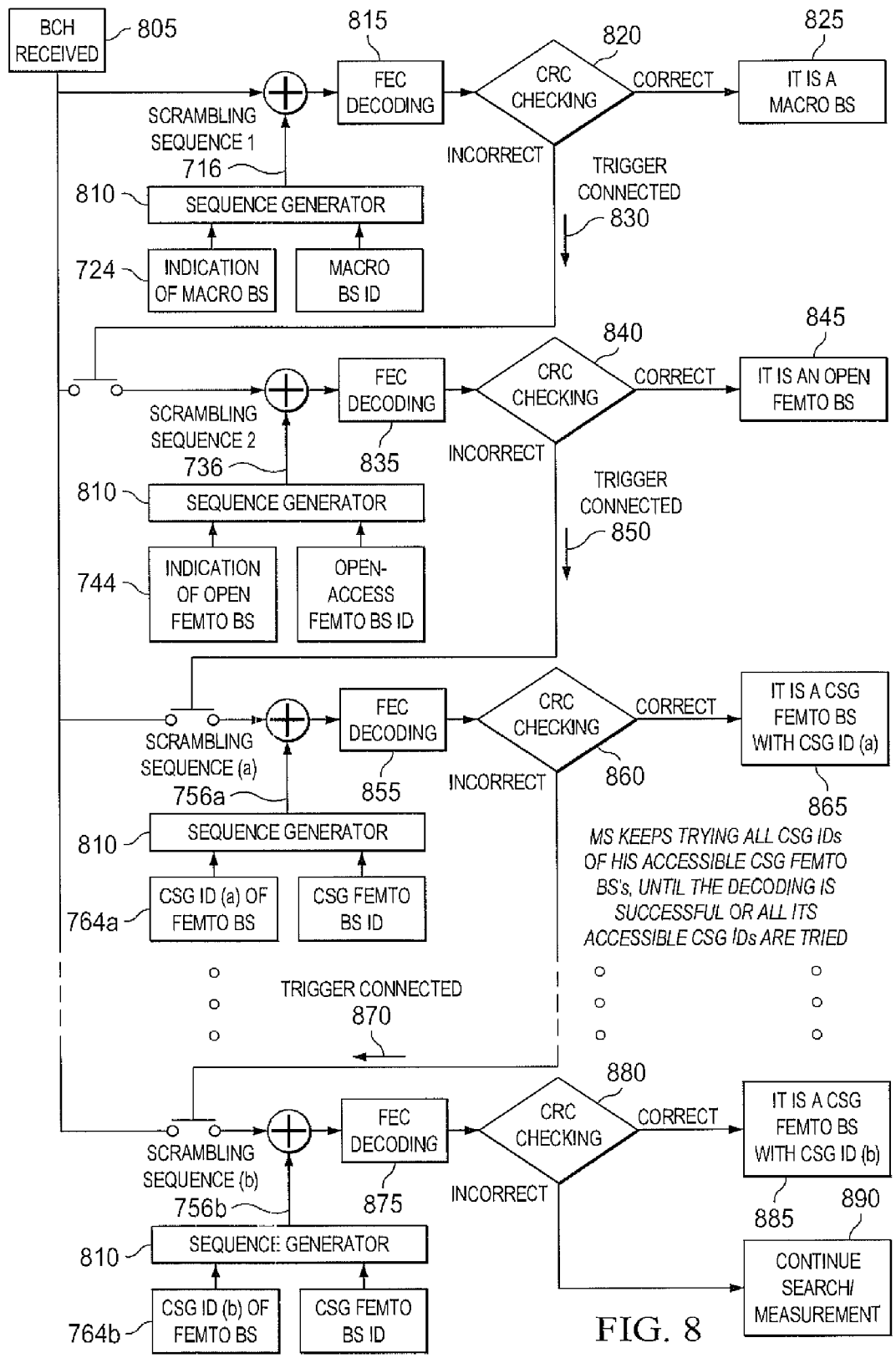
FIG. 8 illustrates a decoding operation by a mobile station using different scrambling sequences to distinguish different base stations and accessibility according to embodiments of the present disclosure.

FIG. 8 illustrates a decoding operation by a mobile station using different scrambling sequences to distinguish different base stations according to embodiments of the present disclosure. The embodiment of the decoding operation 800 shown in FIG. 8 is for illustration only. Other embodiments could be used without departing from the scope of this disclosure.

In some embodiments, MS 116 receives the BCH in step 805. MS 116 attempts to decode the BCH assuming the BCH is from BS 101, e.g., a macro BS, first. MS 116 uses the first scrambling sequence 716 generated by generator block 810 using first value 724 (e.g., the indication of the macro BS). For example, sequence generator block 810 can be located a plurality of instructions located in memory 460 configured to cause main processor 440, discussed herein above with respect to FIG. 4, to perform sequence generation. If the decoding 815 is successful and MS 116 determines that the CRC checks right in step 820, then MS 116 identifies, in step 825, that the transmissions are received from BS 101, which is a macro BS.

In the event that MS 116 determines that the CRC is incorrect in step 820, then in step 830, MS 116 attempts decoding the BCH assuming the BCH is from an open-access femto BS. As such, the sequence generator block 805 uses the second scrambling sequence 736 generated by using the second value 744 (e.g., indication of the open-access femto BS). If the decoding in step 835 is successful and MS 116 determines that the CRC checks right in step 840, then MS 116 identifies, in step 845, that the transmissions are received from FBS 106, which is an open-access femto BS.

In the event that MS 116 determines that the CRC is incorrect in step 840, then in step 850, MS 116 attempts decoding the BCH assuming the BCH is from a CSG femto BS with CSG ID (a) 764a. CSG ID (a) 764a is selected from the list of accessible CSG IDs 462 stored in MS 116. The sequence generator block 805 uses CSG ID (a) 764a to generate the third scrambling sequence (a) 756a. In the event that the decoding in step 855 is successful and MS 116 determines that the CRC checks right in step 860, MS 116 identifies in step 865 that the transmissions are from FBS 105, which is a CSG femto BS with CSG ID (a) 764a.

In the event that MS 116 determines that the CRC is incorrect in step 860, then in step 870, MS 116 attempts decoding the BCH assuming the BCH is from a CSG femto BS with CSG ID (b) 764*b*. CSG ID (b) 764*b* is selected from the list of accessible CSG IDs 462 stored in MS 116. The sequence generator block 805 uses CSG ID (b) 764*b* to generate the third scrambling sequence (b) 756*b*. In the event that the decoding in step 875 is successful and MS 116 determines that the CRC checks right in step 880, MS 116 identifies in step 885 that the transmissions are from another FBS (not specifically illustrated), which is a CSG femto BS with CSG ID (b) 764*b*.

Alternatively, in step 890, MS 116 will continue to pick up another CSG ID in the list of his accessible CSG IDs 462, until the decoding is successful or the list of his accessible CSG IDs is exhausted. Thereafter, MS 116 continues the search/measurement process.

In some embodiments, the CSG ID of a closed-subscriber-group communication base station can be indicated in the CRC mask of the CRC functionality used in protecting BCH of the base station. Therefore, no additional payload bits in BCH are required for the indication of CSG ID.

In some embodiments, the BS ID or value indicating the type of BS (e.g., first value 724, second value 744 or CSG ID (x) 764) is in larger length than the CRC or scrambling sequence used. In such embodiments, the base stations, e.g., one or more of BS 101-103 and/or FBS 104-106 is configured to use a CRC with larger length to match up the length of the BS ID (or other value such as CSG ID), or alternatively use the full size of the CRC and apply a remainder of the BS ID (or other value) in the BCH payload. For example, the CRC can be sixteen (16) bits while the BS ID is twenty four (24) bits. FBS 105 changes its CRC from 16 bits to 24 bits by taking 8 bits from payload, or FBS 105 uses sixteen bits of the BS ID as the CRC mask and inserts the remaining eight bits in the BCH payload. For the latter example, when MS 116 receives and decodes the BCH, MS 116 identifies the sixteen bits and remainder (i.e., the eight bits) in the BCH payload. MS 116 is configured to assemble the sixteen bits used in the CRC mask with the remainder in order to obtain the BS ID for FBS 105.

In some embodiments, the femto base station 106 is a hybrid femto base station. A hybrid femto base station is a new type of femto that can be called as CSG-open femtocell, as defined in IEEE 802.16m-08/003r9a, IEEE 802.16m System Description Document (SDD), June 2009 and IEEE 802.16, P802.16m.D1, July, 2009, the contents of both are incorporated by reference in their entirety. The hybrid femtocell is a combination of CSG femtocell and open-access femtocell. The hybrid femtocell can be called differently in different systems. For example, in IEEE 802.16m, the hybrid femtocell is called CSG-open femto. A previously defined CSG femto, which means it is accessible to the MSs who subscribe to the CSG while the MSs who do not subscribe the CSG should not try to access it, can be called as CSG-closed femto, as in IEEE 802.16m, although it can be called in other names in different systems.

FBS 106, as a hybrid femto BS, is primarily accessible to the mobile stations that belong to its closed subscriber group (CSG), while other mobile stations, outside the CSG, may also access such Femto BS, and will be served at lower priority. A CSG-Open Femto BS, such as FBS 105, will provide service to non-subscriber group mobile stations as long as the quality of service (QoS) of subscriber group mobile stations in its CSG is not compromised. For example, if MS 113 is a subscriber to FBS 106 and MS 114 is not a subscriber to FBS 106, FBS 106 can provide service to MS 114 so long as the QoS of MS 113 is not compromised.

In contrast, FBS 105, as a CSG-Closed Femto BS, is accessible only to the MSs that are in its CSG, with exceptions such as emergency services. Mobile stations that are not the members of the FBS 105 CSG, should not try to access CSG-Closed Femto BSs.

MS 113 includes the CSG ID of the CSG-open femto, such as FBS 106, in its white-list (e.g., included in the list of CSG IDs 462) so that MS 113 can know whether it is a member or non-member; then MS 113 can select the femto base station accordingly. MS 113 may prefer to access a member CSG-open femto, such as FBS 106, rather than accessing a non-member CSG-open femto, even if the member femto has a slightly weaker signal than the non-member femto.

LTE release 8 proposes that the CSG ID to be carried in the payload of broadcast channel. However, broadcast channel is very expensive resource; so this method is very costly.

MS 113 can know whether the BS is a CSG-closed or CSG-open type, before or when MS 113 proceeds accordingly with the methods to decode the CSG ID. For example, if the BS is CSG-closed (or CSG), MS 113 can use the methods described previously, or if the BS is CSG-open type, MS 113 can use the methods as shown in following embodiments. The CSG-closed or CSG-open type may be differentiated by the preamble sequence partitions where the preamble sequence can be carried in the synchronization channel. MS 113 may store the partitioning information and can know whether the BS is a CSG-closed or CSG-open type, by checking the decoded preamble sequence belonging to the preamble partition assigned to CSG-closed type or the preamble partition assigned to CSG-open type, and deciding the type of the BS accordingly. Another way to differentiate CSG-closed or CSG-open type can be to use some indication in broadcast channel, such as, one bit '1' for CSG-closed, '0' for CSG-open, or some other indications.

In embodiments of the present disclosure, the CSG ID can be carried by scrambling CRC of broadcast channel, which can reduce the overhead. However, since CSG-open femtos include a uniqueness compared with the general CSG femtos, MS 113 can be configured to identify that MS 113 is a member or non-member of the CSG-open femto more efficiently.

Figure 9:
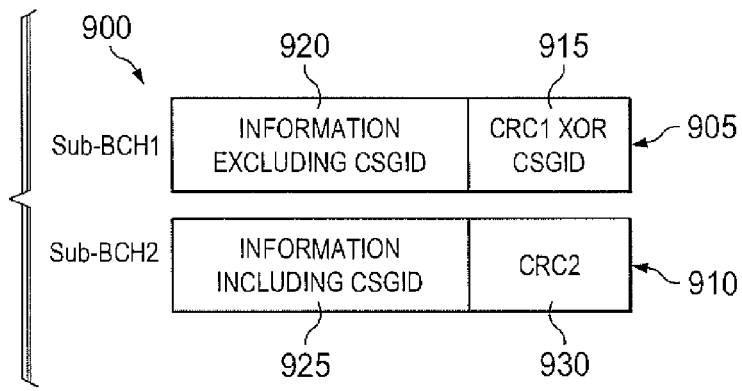
FIGS. 9, 11 and 13 illustrate broadcast channels according to embodiments of the present disclosure.

FIG. 9 illustrates a broadcast channel according to embodiments of the present disclosure. The embodiment of the broadcast channel (BCH) 900 shown in FIG. 9 is for illustration only. Other embodiments could be used without departing from the scope of this disclosure.

The Broadcast Channel (BCH) 900 is the control channel on which a base station, such as FBS 106, broadcasts some of its most important system information. For example, in an OFDM based multiple-input-multiple-output (MIMO) wireless system, the BCH often carries information about system bandwidth, antenna configuration, configuration of other control channels, and other critical system configurations. A mobile station needs to correctly detect the BCH of a base station in order to establish further communication with that base station.

The BCH can consist of several sub-BCHs and these sub-BCHs can broadcast different system information for different purposes and in different periodicity. The BCH may be referred to as different channels in different systems.

The BCH 900 can include a number of sub-channels, such as sub-BCH1 905 and sub-BCH2 910. In this example, FBS 106 includes two sub-BCHs and Sub-BCH1 905 is transmitted more frequently than sub-BCH2 910. However, the BCH 900 can include more than two sub-channels transmitting at the same or different periodicities.

FBS 106 (that is, a CSG-Open base station or a hybrid base station) applies its CSG ID (hybrid CSG ID) or a sequence generated from its CSG ID as the CRC mask 915 to the CRC of sub-BCH1 905. FBS 106 does not include the CSG ID in the payload 920 of sub-BCH1 905. FBS 106 applies the CSG ID as the CRC mask 915 by combining a first CRC (CRC1) with the CSG ID in an XOR operation to form the CRC mask 915. FBS 106 also broadcasts its CSG ID in the payload 925 of sub-BCH2 910. FBS 106 includes a second CRC (CRC2) 930, which does not include the CSG ID. FBS 106 can broadcast its CSG ID in the payload 925 less frequently than the CSG ID contained in sub-BCH1 905.

MS 113 can recover the CSG ID by XORing the received (CRC XOR CSGID) and the generated CRC based on the received information, and check whether the recovered CSG ID is in the set "S" of the CSGs to which MS 113 subscribes. If it is, then MS 113 decides that MS 113 is a member of this hybrid base station, FBS 106. Otherwise, MS 113 can decode the other sub-BCH that contains the CSG ID in the payload, and decide whether it is a member or non-member of FBS 106, accordingly.

Figure 10:
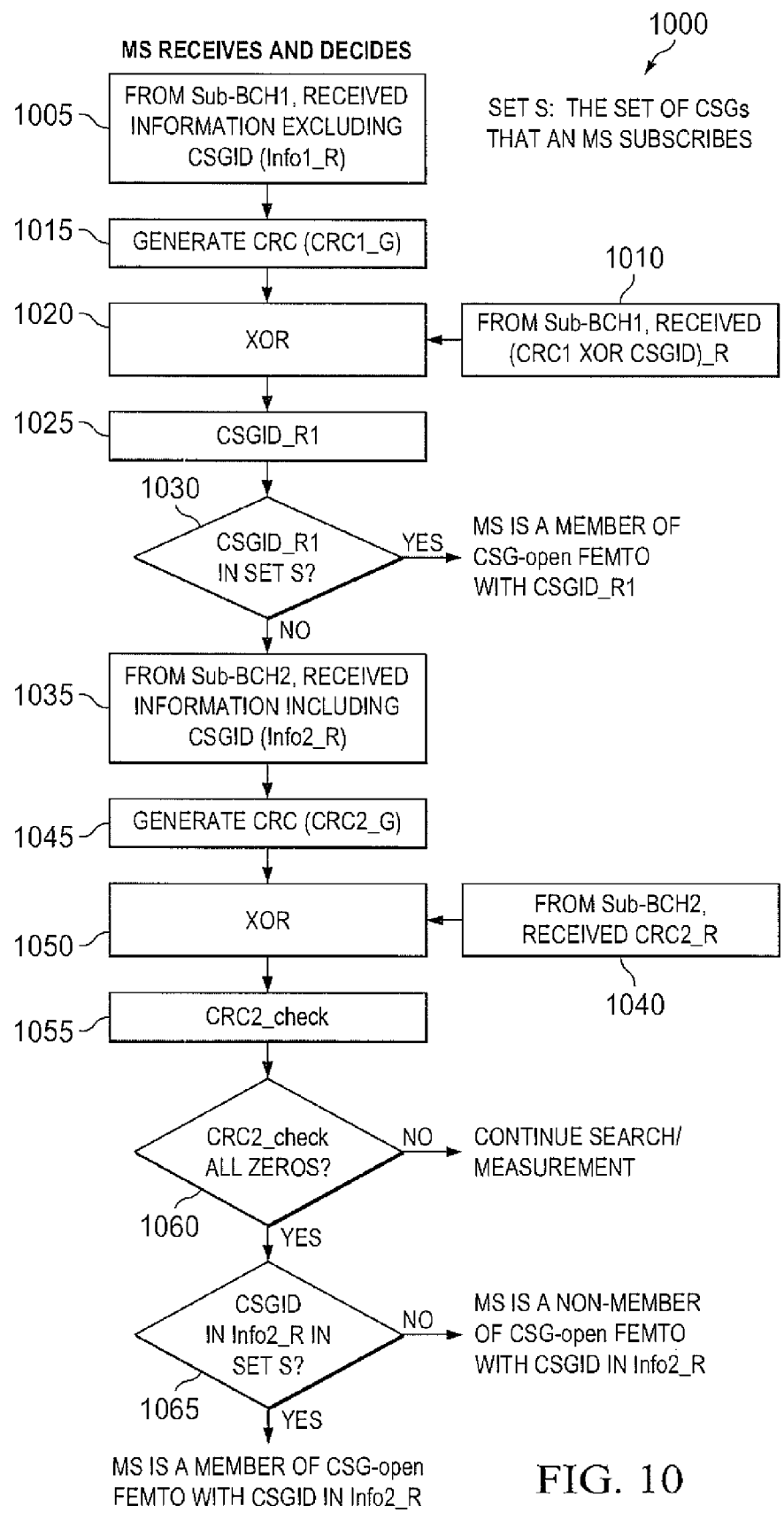
FIGS. 10, 12 and 14 illustrate processes for recovering a hybrid CSG ID according to embodiments of the present disclosure.

FIG. 10 illustrates a process for recovering a hybrid CSG ID according to embodiments of the present disclosure. The embodiment of the process 1000 shown in FIG. 10 is for illustration only. Other embodiments could be used without departing from the scope of this disclosure.

MS 113 receives the information in the payload 920 in sub-BCH1 905 in block 1005. The information received in the payload 920 does not include the hybrid CSG ID. MS 113 also receives the CRC mask 915 in sub-BCH1 905 in block 1010. In block 1015, MS 113 generates a CRC (CRC1_G) based on the information received in the payload 920 of sub-BCH1 905. MS 113 XOR's the CRC mask 915 and the CRC1_G in block 1020. In block 1025, MS 113 identifies the output of the XOR operation in block 1020 as a received CSG ID (CSGID_R1). MS 113 determines, in block 1030, if the received CSGID (CSGID_R1) is included in its white-list (that is, if CSGID_R1 is included in the list of CSG IDs 462 corresponding to femtos to which MS 113 subscribes).

If CSGID_R1 is included in the white-list, MS 113 determines that it is a member of FBS 106 (the CSG-open femto) with CSG ID=CSGID_R1. Alternatively, if CSGID_R1 is not included in the white-list, MS 113 proceeds to decode the CSG ID from sub-BCH2 910. For example, the CSG ID may have been incorrectly received in sub-BCH1 905, or the CSG ID may have been correctly received but MS 113 is not a member of the CSG for FBS 106; therefore, MS 113 attempts to recover the CSG ID received from sub-BCH2 910.

In block 1035, MS 113 receives information in the payload 925 in sub-BCH2 910. MS 113 decodes sub-BCH2 910, which contains the CSG ID in the payload 925. MS 113 also receives CRC2 930 from sub-BCH2 910 in block 1040. In block 1015, MS 113 generates a CRC (CRC2_G) based on the information received in the payload 925 of sub-BCH2 910. MS 113 XOR's the CRC mask 915 and the CRC1_G in block 1050 and performs a CRC check in block 1055. If the CRC on sub-BCH cannot pass the CRC check in block 1060, MS 113 continue the search/measurement. Alternatively, if the CRC on sub-BCH passes the CRC check in block 1060, MS 113 checks, in block 1065, if the CSG ID in the payload 925 is included in the white-list (that is, is included in the list of CSG IDs 462 corresponding to femtos to which MS 113 subscribes).

If the CSG ID in the payload 925 is included in the white-list, MS 113 determines that it is a member of FBS 106 (the CSG-open femto). Alternatively, if the CSG ID in the payload 925 is not included in the white-list, MS 113 determines that MS 113 is a non-member of FBS 106.

Accordingly, the CSG ID of a closed-subscriber-group communication base station can be indicated in a CRC mask used to protect sub-BCH1 905. Therefore, no additional payload bits in sub-BCH1 905 are needed for the indication of CSG ID. Sub-BCH1 905 can be transmitted more frequently than sub-BCH2 910. Therefore, MS 113 can determine that MS 116 is a member of FBS 106 (the CSG-open femto) quickly, based upon sub-BCH1 910. In contrast, MS 114 (the non-member MS) waits for longer time period to determine that MS 114 is a non-member, based on the decoding of sub-BCH2 910. This automatically gives a member MS a faster or a prioritized accessibility check as compared with non-member MS.

Figure 11:
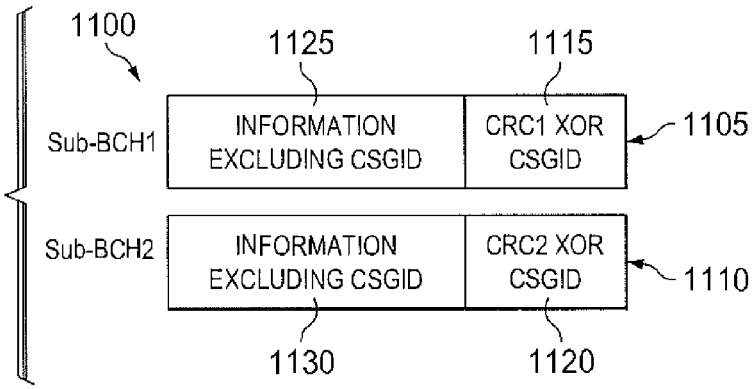

FIG. 11 illustrates another broadcast channel according to embodiments of the present disclosure. The embodiment of the broadcast channel (BCH) 1100 shown in FIG. 11 is for illustration only. Other embodiments could be used without departing from the scope of this disclosure.

The BCH 1100 can include a number of sub-channels, such as sub-BCH1 1105 and sub-BCH2 1110. In this example, FBS 106 includes two sub-BCHs and Sub-BCH1 1105 and sub-BCH2 1110 may have different periodicity of transmission. However, the broadcast channel can include more than two sub-channels transmitting at the same or different periodicities.

FBS 106 (that is, a CSG-Open base station or a hybrid base station) applies its CSG ID (hybrid CSG ID) or a sequence generated from its CSG ID as the CRC mask 1115, 1120 to the CRC of multiple sub-channels, such as CRC mask 1115 sub-BCH1 1105 and CRC mask 1120 of sub-BCH2 1110. FBS 106 does not include the CSG ID in the payload 1125 of sub-Ball 1105. FBS 106 also does not include the CSG ID in the payload 1130 of sub-BCH2 1110. FBS 106 applies the CSG ID as the CRC mask 1115, 1120 by combining a first CRC (CRC1) with the CSG ID in an XOR operation to form the CRC mask 1115 and combining a second CRC (CRC2) with the CSG ID in an XOR operation to form the CRC mask 1120.

MS 113 can recover the CSG ID by XORing the received CRC mask 1115 for sub-BCH1 1105 (that is, CRC1 XOR CSGID) and a generated CRC based on the received information, and can check whether the recovered CSG ID is in the set "S" of the CSGs to which MS 113 subscribes. If the recovered CSG ID is included in the set "S", then MS 113 determines that MS 113 is a member of FBS 106. Otherwise, MS 113 decodes the other sub-BCH, sub-BCH2 1110, using the same process and checks whether the recovered CSG ID from sub-BCH2 1110 is the same as the CSG ID recovered from sub-BCH1 1105. If the recovered CSG ID from sub-BCH2 1110 is the same as the CSG ID recovered from sub-BCH1 1105, then MS 113 determines that MS 113 is a non-member of the hybrid BS, FBS 106. Alternatively, if the recovered CSG ID from sub-BCH2 1110 is not the same as the CSG ID recovered from sub-BCH1 1105, MS 113 continues the search/measurement.

Figure 12:
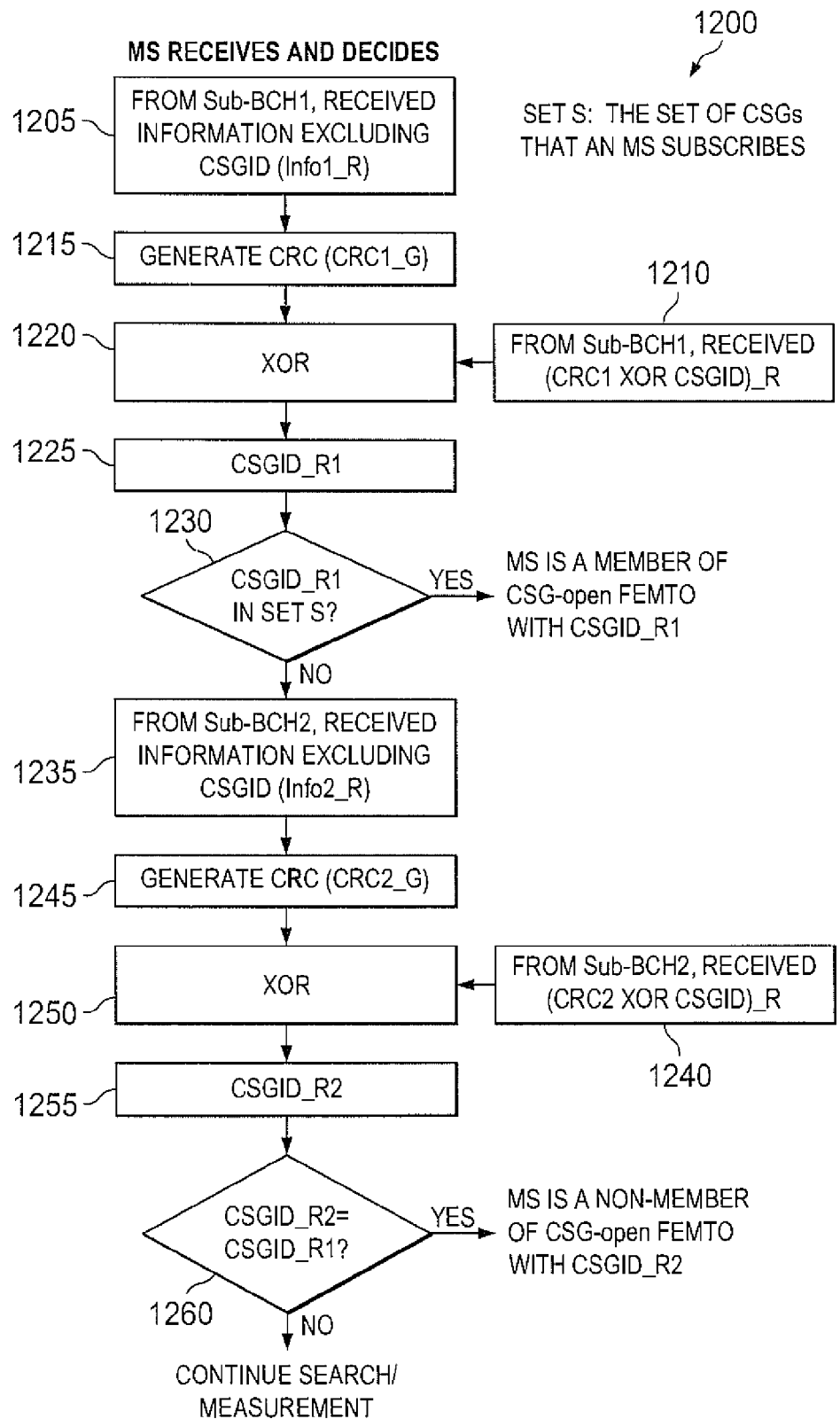

FIG. 12 illustrates another process for recovering a hybrid CSG ID according to embodiments of the present disclosure. The embodiment of the process 1200 shown in FIG. 12 is for illustration only. Other embodiments could be used without departing from the scope of this disclosure.

MS 113 receives the information in the payload 1125 in sub-BCH1 1105 in block 1205. The information received in the payload 1125 does not include the hybrid CSG ID. MS 113 also receives the CRC mask 1115 in sub-BCH1 1105 in block 1210. In block 1215, MS 113 generates a CRC (CRC1_G) based on the information received in the payload 1125 of sub-BCH1 1105. MS 113 XOR's the CRC mask 1115 and the CRC1_G in block 1220. In block 1225, MS 113 identifies the output of the XOR operation in block 1220 as a received CSG ID (CSGID_R1). MS 113 determines, in block 1230, if the received CSGID (CSGID_R1) is included in its white-list (that is, if CSGID_R1 is included in the list of CSG IDs 462 corresponding to femtos to which MS 113 subscribes).

If CSGID_R1 is included in the white-list, MS 113 determines that MS 113 is a member of FBS 106 (the CSG-open femto) with CSG ID=CSGID_R1. Alternatively, if CSGID_R1 is not included in the white-list, MS 113 proceeds to decode the CSG ID from sub-BCH2 1110. For example, the CSG ID may have been incorrectly received in sub-BCH1 1105; therefore, MS 113 attempts to recover the CSG ID received from sub-BCH2 1110.

In block 1235, MS 113 receives information in the payload 1130 in sub-BCH2 1110. The information received in the payload 1130 does not include the hybrid CSG ID. MS 113 also receives the CRC mask 1120 in sub-BCH2 1110 in block 1240. In block 1245, MS 113 generates a CRC (CRC2_G) based on the information received in the payload 1130 of sub-BCH2 1110. MS 113 XOR's the CRC mask 1120 and the CRC2_G in block 1250. In block 1255, MS 113 identifies the output of the XOR operation in block 1250 as a received CSG ID (CSGID_R2). MS 113 determines, in block 1260, if the received CSGID (CSGID_R2) is the same as CSGID_R1, which was received on sub-BCH1 1105.

If CSGID_R2 is the same as CSGID_R1, MS 113 determines that MS 113 is a non-member of FBS 106 (the CSG-open femto) with CSG ID=CSGID_R2. Alternatively, if CSGID_R2 is not the same as CSGID_R1, MS 113 continues searching and measurement.

Accordingly, the CSG ID of a closed-subscriber-group communication base station can be indicated in a CRC mask of a CRC protecting one or more sub-BCH of the base station. Therefore, no additional payload bits in a sub-BCH are needed for the indication of CSG ID. Sub-BCH1 1105 can be transmitted more frequently than sub-BCH2 1110; therefore, MS 113 can quickly determine that MS 113 is a member of FBS 106, based on sub-BCH1 1105, while the non-member MS, such as MS 114, waits for longer time to determine that MS 114 is a non-member, based on the decoding of sub-BCH2 1110. This automatically gives a member MS, such as MS 113, faster or a prioritized accessibility check as compared to non-member MS, such as MS 114.

Figure 13:
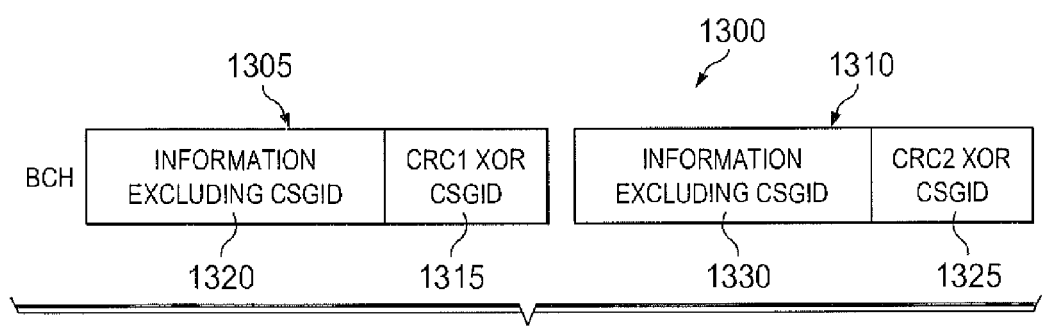

FIG. 13 illustrates another broadcast channel according to embodiments of the present disclosure. The embodiment of the broadcast channel (BCH) 1300 shown in FIG. 13 is for illustration only. Other embodiments could be used without departing from the scope of this disclosure.

The BCH 1300 can be a single channel or include more than one sub-channels. In the example shown in FIG. 13, the base station has one BCH 1300. However, the BCH 1300 can include more than one sub-channel that transmits at the same or different periodicities.

FBS 106 transmits multiple packets, 1305, 1310 on BCH 1300. FBS 106 (that is, a CSG-Open base station or a hybrid base station) applies its CSG ID (hybrid CSG ID) or a sequence generated from its CSG ID as the CRC mask 1315 to the CRC of a first packet 1305. FBS 106 does not include the CSG ID in the payload 1320 of the first packet 1305. FBS 106 applies the CSG ID as the CRC mask 1315 by combining a CRC (CRC) with the CSG ID in an XOR operation to form the CRC mask 1315. FBS 106 also applies its CSG ID (hybrid CSG ID) or a sequence generated from its CSG ID as the CRC mask 1325 to the CRC of a second packet 1310. FBS 106 does not include the CSG ID in the payload 1330 of the second packet 1310. FBS 106 applies the CSG ID as the CRC mask 1325 by combining a CRC (CRC) with the CSG ID in an XOR operation to form the CRC mask 1325.

MS 113 can recover the CSG ID by XORing the received CRC mask 1315 (i.e., the CRC XOR CSGID) and a generated CRC based on the information received in the first packet 1305, and checks whether the recovered CSG ID is in the set "S" of the CSGs to which MS 113 subscribes. If the CSG ID is included in the set "S", then MS 113 decides that MS 113 is a member of this hybrid femto base station (CSG-open FBS). Otherwise, MS 113 decodes the second packet 1310, using the same method, and checks whether the recovered CSG ID is the same as the one recovered from the first packet 1305. If the recovered CSG ID from the second packet 1310 is the same as the CSG ID recovered from the first packet 1305, then MS 113 determines that MS 113 is a non-member of the hybrid BS, FBS 106. Alternatively, if the recovered CSG ID from the second packet 1310 is not the same as the CSG ID recovered from the first packet 1305, MS 113 continues the searching and measurement.

Figure 14:
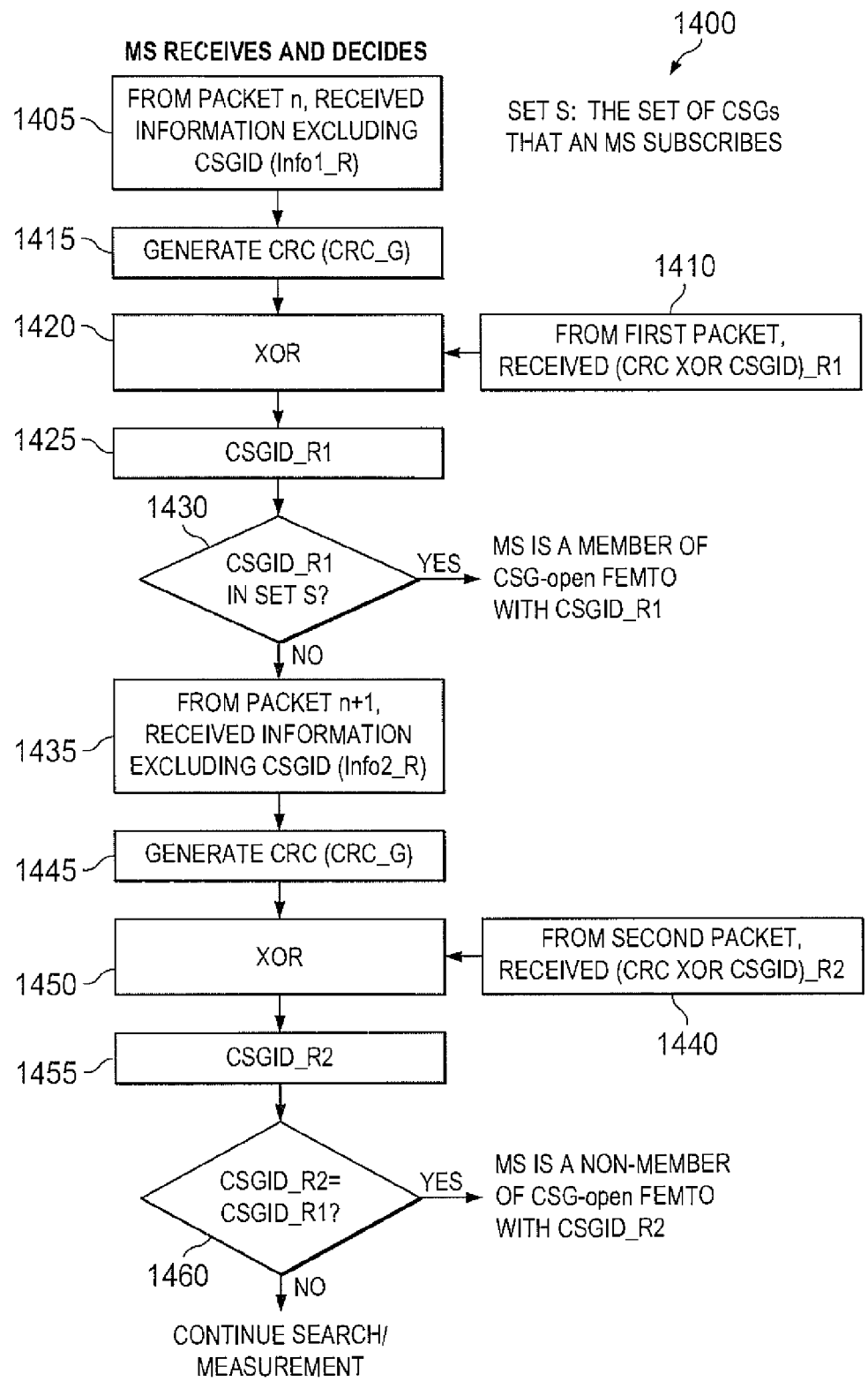

FIG. 14 illustrates another process for recovering a hybrid CSG ID according to embodiments of the present disclosure. The embodiment of the process 1400 shown in FIG. 14 is for illustration only. Other embodiments could be used without departing from the scope of this disclosure.

MS 113 receives the information in the payload 1320 in the first packet 1305 in block 1405. The information received in the payload 1320 does not include the hybrid CSG ID. MS 113 also receives the CRC mask 1315 in the first packet 1305 in block 1410. In block 1415, MS 113 generates a CRC (CRC_G) based on the information received in the payload 1320 of the first packet 1305. MS 113 XOR's the CRC mask 1315 and the CRC_G in block 1420. In block 1425, MS 113 identifies the output of the XOR operation in block 1420 as a received CSG ID (CSGID_R1). MS 113 determines, in block 1430, if the received CSGID (CSGID_R1) is included in its white-list (that is, if CSGID_R1 is included in the list of CSG IDs 462 corresponding to femtos to which MS 113 subscribes).

If CSGID_R1 is included in the white-list, MS 113 determines that MS 113 is a member of FBS 106 (the CSG-open femto) with CSG ID=CSGID_R1. Alternatively, if CSGID_R1 is not included in the white-list, MS 113 proceeds to decode the CSG ID from the second packet 1310. For example, the CSG ID may have been incorrectly received in the first packet 1305; therefore, MS 113 attempts to recover the CSG ID received from the second packet 1310.

In block 1435, MS 113 receives information in the payload 1330 in the second packet 1310. The information received in the payload 1330 does not include the hybrid CSG ID. MS 113 also receives the CRC mask 1325 in the second packet 1310 in block 1440. In block 1445, MS 113 generates a CRC (CRC_G) based on the information received in the payload 1330 of the second packet 1310. MS 113 XOR's the CRC mask 1320 and the (CRC_G) in block 1450. In block 1455, MS 113 identifies the output of the XOR operation in block 1450 as a received CSG ID (CSGID_R2). MS 113 determines, in block 1460, if the received CSGID (CSGID_R2) is the same as CSGID_R1, which was received on the first packet 1305.

If CSGID_R2 is the same as CSGID_R1, MS 113 determines that MS 113 is a non-member of FBS 106 (the CSG-open femto) with CSG ID=CSGID_R2. Alternatively, if CSGID_R2 is not the same as CSGID_R1, MS 113 continues searching and measurement.

Accordingly, the CSG ID of a closed-subscriber-group communication base station can be indicated in a CRC mask of a CRC protecting one or more packets on the BCH of the femto base station. Therefore, no additional payload bits in a BCH are needed for the indication of CSG ID. TMS 113 can quickly determine that MS 113 is a member of FBS 106, based on the first packet 1305, while the non-member MS, such as MS 114, waits for longer time to determine that MS 114 is a non-member, based on the decoding of the second packet 1310. This automatically gives a member MS, such as MS 113, faster or a prioritized accessibility check as compared to non-member MS, such as MS 114.

In some embodiments, the CSG ID is carried in broadcast messages. The CSG ID can be combined (such as scrambled) with the CRC of broadcast messages instead of the broadcast channels. The examples of the process herein above that are for CSG-closed femto BS, which may only need the first decision block, can also be applied to the broadcast messages.

In some embodiments, the cases that the CSGID can be split into multiple pieces. A different piece could be transmitted over different broadcast channels or broadcast messages. The special case of the methods above that are for CSG-closed femto BS, which may only need the first decision block, can also be applied to CSGID splitting.

In some embodiments, the process herein above are applicable when multiple packets are used for the decision of MS being a member of femto CSG-open with CSGID, or a member of femto CSG-closed with CSGID.

In some embodiments, when multiple packets are used to judge whether MS 113 is a member or non-member of CSG-open/closed, the rules for a decision may not be limited as shown in the figures. For example, a majority rule can be applied, such as, if there are three CSGID_R1,2,3, then if two of the CSGID's are equal (e.g., CSGID_R1=CSGID_R3), then MS 113 can judge that the CSGID is CSGID_R1.

If MS 113 wants to initiate an emergency call, trying to access CSG-closed (or CSG) femto BS, MS 113 may need to use the similar methods for MS 113 to decide or decode the CSGID for CSG-open BS case as described in previous embodiments, such as, decode the CSGID more than one times, and compare the decoded CSGIDs. If they are the same or majority are the same, MS 113 can judge that the message or the BCH is received/decoded correctly and the CSGID is the one decoded, then regardless whether the CSGID decoded is in the whitelist or not, MS 113 may proceed to access the BS. When MS 113 judges that the received/decoded message or the BCH is in error, MS 113 may continue search or decoding.

As extensions of the aforementioned embodiments, the methods mentioned above can be combined, and the methods mentioned above can be combined with other methods of identifying base stations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a mobile station capable of communicating with a plurality of base stations, the mobile station comprising:
   a receiver configured to receive a first broadcast channel communication from at least one of the plurality of base stations; and
   a processor configured to extract a base station identifier from a cyclic redundancy check (CRC) mask in the first broadcast channel communication, and use the extracted base station identifier to determine if the mobile station is a member authorized closed access to the at least one of the plurality of base stations.

2. The mobile station as set forth in claim 1, wherein the base station identifier is an identifier associated with at least one hybrid femto base station.

3. The mobile station as set forth in claim 1, further comprising a memory, the memory configured to store at least one identifier, wherein the processor determines if the mobile station is authorized closed access to the at least one of the plurality of base stations by comparing the extracted base station identifier with the stored at least one identifier.

4. The mobile station as set forth in claim 1, wherein the receiver is configured to receive a second broadcast channel communication from the at least one of the plurality of base stations, the second broadcast channel communication comprising the base station identifier, and wherein the processor is configured to recover the base station identifier from the second broadcast channel communication, the processor further configured to use the recovered base station identifier to determine if the mobile station is a non-member allowed open access to the at least one of the plurality of base stations.

5. The mobile station as set forth in claim 4, wherein the first broadcast channel communication comprises a first sub-broadcast channel of a broadcast channel and the second broadcast channel communication comprises a second sub-broadcast channel of the broadcast channel.

6. The mobile station as set forth in claim 4, wherein the first broadcast channel communication comprises a first packet transmitted on a broadcast channel and the second broadcast channel communication comprises a second packet transmitted on the broadcast channel.

7. The mobile station as set forth in claim 4, wherein the processor further is configured to compare the extracted base station identifier from the first broadcast communication and the recovered base station identifier from the second communication.

8. The mobile station as set forth in claim 4, wherein the processor is configured to recover the base station identifier from one of:
   a first cyclic redundancy check (CRC) mask applied to the second broadcast channel communication,
   a first scrambling sequence applied to the first broadcast channel communication, and
   a payload of the second broadcast communication.

9. A wireless communications network comprising at least one hybrid femto base station capable of communicating with a plurality of mobile stations, the at least one hybrid femto base station comprising:
   a controller configured to apply a base station identifier to a cyclic redundancy check (CRC) for a first broadcast channel communication to form a CRC mask; and
   a transceiver configured to transmit the CRC mask with the first broadcast channel communication,
   wherein the base station identifier configured to be used by the mobile station to determine if the mobile station is a member authorized closed access to the at least one hybrid femto base station.

10. The network as set forth in claim 9, wherein the transceiver is configured to transmit a second broadcast channel communication comprising the base station identifier, and wherein the base station identifier included in the second broadcast communication is configured to be used by the mobile station to determine if the mobile station is a non-member allowed open access to the at least one hybrid femto base station.

11. The network as set forth in claim 10, wherein the first broadcast channel communication is transmitted on a first sub-broadcast channel of the broadcast channel and the second broadcast channel communication is transmitted on a second sub-broadcast channel of the broadcast channel.

12. The network as set forth in claim 10, wherein the first broadcast channel communication comprises a first packet transmitted on a broadcast channel and the second broadcast channel communication comprises a second packet transmitted on the broadcast channel.

13. The network as set forth in claim 10, wherein the controller is configured to include the base station identifier in the second broadcast channel communication by:
   exclusive-ORing (XOR'ing) the base station identifier with a cyclic redundancy check (CRC) to form the CRC mask applied to the second broadcast channel communication, and
   including the base station identifier in a payload of the second broadcast communication.

14. The network as set forth in claim 9, wherein the controller is configured to exclusive OR (XOR) the base station identifier with the CRC to form the CRC mask.

15. For use in a wireless communication system, a method of identifying accessibility of a hybrid femto base station comprising open access and closed subscriber groups, the method comprising:
   receiving, by a mobile station, a first broadcast channel communication on a broadcast channel;
   extracting a base station identifier from a cyclic redundancy check (CRC) mask in the first broadcast channel communication; and
   determining, based on the base station identifier, if the mobile station is a member authorized closed access to the hybrid femto base station.

16. The method as set forth in claim 15, wherein extracting further comprises exclusive-ORing (XORing) a cyclic redundancy check generated from information received in the first broadcast channel communication with the CRC mask.

17. The method as set forth in claim 15, wherein determining comprises comparing the extracted base station identifier with the stored at least one identifier.

18. The method as set forth in claim 15, further comprising:
   receiving, by the mobile station, a second broadcast channel communication on the broadcast channel;
   recovering the base station identifier from the second broadcast channel communication; and
   if the mobile station determines that the mobile station is not a member authorized closed access to the hybrid femto base station, determining, based on the recovered base station identifier from the second broadcast channel communication, if the mobile station is a non-member authorized open access to the hybrid femto base station.

19. The method as set forth in claim 18, wherein the first broadcast channel communication comprises a first sub-broadcast channel of the broadcast channel and the second broadcast channel communication comprises a second sub-broadcast channel of the broadcast channel.

20. The method as set forth in claim 18, wherein the first broadcast channel communication comprises a first packet transmitted on a broadcast channel and the second broadcast channel communication comprises a second packet transmitted on the broadcast channel.

21. The method as set forth in claim 18, wherein determining, based on the recovered base station identifier from the second broadcast channel communication, if the mobile station is a non-member authorized open access to the hybrid femto base station comprises comparing the extracted base station identifier from the first broadcast communication and the recovered base station identifier from the second communication.

22. The mobile station of claim 1, wherein to extract the base station identifier from the CRC mask, the processor is configured to:
   generate a CRC based on information received in the first broadcast channel communication; and
   apply the generated CRC to the CRC mask to extract the base station identifier.

* * * * *